(12) United States Patent
Vankayala et al.

(10) Patent No.: US 12,267,173 B2
(45) Date of Patent: Apr. 1, 2025

(54) METHOD AND APPARATUS FOR ENABLING OPTIMIZED DECODING OF DATA PACKET IN HARQ BASED COMMUNICATION

(71) Applicant: SAMSUNG ELECTRONICS CO., LTD., Suwon-si (KR)

(72) Inventors: Satya Kumar Vankayala, Bangalore (IN); Abhay Kumar Sah, Bangalore (IN); Anshuman Nigam, Bangalore (IN); Satya Venkata Uma Kishore Godavarti, Bangalore (IN); Tirthankar Mittra, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/754,892

(22) PCT Filed: Oct. 15, 2020

(86) PCT No.: PCT/KR2020/014124
§ 371 (c)(1),
(2) Date: Apr. 14, 2022

(87) PCT Pub. No.: WO2021/075888
PCT Pub. Date: Apr. 22, 2021

(65) Prior Publication Data
US 2024/0031074 A1 Jan. 25, 2024

(30) Foreign Application Priority Data

Oct. 18, 2019 (IN) .............................. 201941042232
Oct. 14, 2020 (IN) .............................. 201941042232

(51) Int. Cl.
*H04L 1/1812* (2023.01)
(52) U.S. Cl.
CPC ................................. *H04L 1/1819* (2013.01)

(58) Field of Classification Search
CPC ... H04L 1/0052; H04L 1/1819; H04L 1/1845; H04L 1/20; H04L 1/0045–0055
See application file for complete search history.

(56) References Cited

U.S. PATENT DOCUMENTS 6,671,852 B1 * 12/2003 Ariel ................. H03M 13/2975
714/780
7,770,090 B1 * 8/2010 Kons ................. H03M 13/1137
714/780

(Continued)

FOREIGN PATENT DOCUMENTS

KR 10-2019-0116518 A 10/2019
WO 2015120907 A1 8/2015

OTHER PUBLICATIONS

International Search Report and Written Opinion of the International Searching Authority in connection with International Application No. PCT/KR2020/014124 issued Jan. 26, 2021, 8 pages.

(Continued)

*Primary Examiner* — Dung B Huynh

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE).
Embodiments of present disclosure relates to apparatus and method for enabling optimized decoding of data packet in HARQ based communication in wireless communication network. Initially, unsuccessful decoding of instant data packet received from transmitting unit is identified. If number of previous data packets, received preceding the instant data packet, is greater than one, subsequent decoding is enabled in the receiving unit for the instant data packet. The subsequent decoding includes generating sequentially, modified versions of data packets, for decoding. The modified versions comprises all possible weighted combinations (Continued)

of the data packets with at least one of the instant data packet and one or more of the previous data packets. Each of the modified versions is decoded individually and a subsequent modified version from the modified versions is generated when unsuccessful decoding is identified for previously generated modified version from the modified versions.

15 Claims, 22 Drawing Sheets

(56) References Cited

U.S. PATENT DOCUMENTS

| | | | |
|---|---|---|---|
| 8,194,588 B2 | 6/2012 | Park et al. | |
| 8,411,709 B1* | 4/2013 | Choi | H04L 1/1816 370/216 |
| 8,418,022 B2* | 4/2013 | Limberg | H03M 13/2972 714/755 |
| 9,225,477 B1* | 12/2015 | Lee | G06F 11/1004 |
| 10,230,501 B2 | 3/2019 | Scherb et al. | |
| 10,505,568 B2* | 12/2019 | Jia | H03M 13/6306 |
| 10,567,008 B2* | 2/2020 | Hussain | H04L 1/0045 |
| 11,921,674 B2* | 3/2024 | Pankanti | G06N 3/045 |
| 2005/0007948 A1* | 1/2005 | Wan | H04L 1/1816 370/208 |
| 2006/0023815 A1* | 2/2006 | Malm | H04L 1/1816 375/340 |
| 2006/0156163 A1* | 7/2006 | Berens | H04L 1/1845 714/748 |
| 2007/0118790 A1* | 5/2007 | Kim | H03M 13/09 714/781 |
| 2007/0162812 A1 | 7/2007 | Herrmann | |
| 2008/0008257 A1* | 1/2008 | Yonesi | H04L 1/203 375/262 |
| 2008/0276147 A1 | 11/2008 | Gho et al. | |
| 2008/0282125 A1* | 11/2008 | Hafeez | H04L 1/1845 714/748 |
| 2009/0003301 A1* | 1/2009 | Reial | H04L 1/1829 370/342 |
| 2010/0046680 A1* | 2/2010 | Okino | H04L 1/1812 375/346 |
| 2010/0098185 A1* | 4/2010 | Miyazaki | H04L 1/0066 375/267 |
| 2010/0146354 A1* | 6/2010 | Zhang | H04L 1/0029 709/224 |
| 2010/0215075 A1* | 8/2010 | Jonsson | H04B 7/0413 375/267 |
| 2011/0007729 A1* | 1/2011 | Nogami | H04L 1/1854 370/310 |
| 2011/0022915 A1* | 1/2011 | Papageorgiou | H04L 1/0066 714/752 |
| 2011/0113299 A1* | 5/2011 | Power | H04L 1/18 714/E11.131 |
| 2011/0119552 A1* | 5/2011 | Park | H03M 13/2975 714/751 |
| 2011/0126072 A1* | 5/2011 | Yoshimoto | H04L 1/0069 714/751 |
| 2011/0179330 A1* | 7/2011 | Matsumoto | H04L 1/06 714/E11.131 |
| 2011/0197103 A1 | 8/2011 | Cho et al. | |
| 2011/0228883 A1* | 9/2011 | Liu | H04L 1/08 375/340 |
| 2011/0280346 A1* | 11/2011 | Yang | H04L 1/1607 375/343 |
| 2011/0305213 A1* | 12/2011 | Lohr | H04L 1/1887 370/328 |
| 2012/0033767 A1* | 2/2012 | Wilborn | H04L 25/067 375/316 |
| 2012/0099526 A1* | 4/2012 | Murase | H04L 1/0061 370/328 |
| 2012/0275397 A1 | 11/2012 | Hsieh et al. | |
| 2013/0042073 A1* | 2/2013 | Tao | G06F 12/0804 711/E12.07 |
| 2013/0191706 A1* | 7/2013 | Zopf | H04L 1/005 714/776 |
| 2013/0246876 A1* | 9/2013 | Manssour | H04L 1/0041 714/751 |
| 2013/0251013 A1* | 9/2013 | Banister | H04L 25/03318 375/224 |
| 2013/0322287 A1 | 12/2013 | Bontu et al. | |
| 2013/0339813 A1* | 12/2013 | Suresh | H04L 1/1812 714/751 |
| 2013/0346824 A1* | 12/2013 | Bolotov | H03M 13/1111 714/755 |
| 2014/0126454 A1* | 5/2014 | Zhang | H04W 4/06 370/312 |
| 2014/0177687 A1* | 6/2014 | Seol | H04L 27/3488 375/295 |
| 2014/0281843 A1* | 9/2014 | Lo | H04L 1/1896 714/807 |
| 2015/0382362 A1* | 12/2015 | Park | H04L 1/0045 370/330 |
| 2016/0037524 A1* | 2/2016 | Krzymien | H04L 27/2601 370/329 |
| 2016/0270055 A1* | 9/2016 | Larsson | H04L 5/006 |
| 2016/0277156 A1* | 9/2016 | Bayesteh | H04L 1/1819 |
| 2016/0316491 A1* | 10/2016 | Axmon | H04L 5/0058 |
| 2016/0380724 A1* | 12/2016 | Malladi | H04L 1/0045 714/776 |
| 2017/0026941 A1* | 1/2017 | Su | H04L 5/0053 |
| 2017/0099121 A1* | 4/2017 | Uchino | H04L 1/1845 |
| 2017/0187488 A1* | 6/2017 | Rico Alvarino | H04L 1/0059 |
| 2017/0192841 A1* | 7/2017 | Bentley | G11B 20/1833 |
| 2017/0237528 A1* | 8/2017 | Wu | H04L 1/1822 370/329 |
| 2018/0110002 A1* | 4/2018 | Kim | H04L 1/0053 |
| 2018/0139028 A1* | 5/2018 | Lim | H04L 5/0055 |
| 2018/0205505 A1* | 7/2018 | Fisher-Jeffes | H04L 1/1845 |
| 2019/0013907 A1* | 1/2019 | Ljung | H04L 1/1864 |
| 2019/0028119 A1* | 1/2019 | Yang | H03M 13/6306 |
| 2019/0028237 A1* | 1/2019 | Pan | H04L 1/0053 |
| 2019/0068332 A1* | 2/2019 | Hehn | H04L 1/1864 |
| 2019/0089573 A1* | 3/2019 | Larsson | H04L 1/1845 |
| 2019/0199482 A1* | 6/2019 | Ji | H04L 43/0847 |
| 2019/0229848 A1* | 7/2019 | Gupta | H04B 7/024 |
| 2019/0253213 A1* | 8/2019 | Garlapati | H04J 13/0029 |
| 2019/0273574 A1* | 9/2019 | Goektepe | H04L 1/1864 |
| 2019/0349126 A1* | 11/2019 | Andgart | H04L 1/0013 |
| 2019/0356430 A1 | 11/2019 | Cheng et al. | |
| 2020/0007275 A1* | 1/2020 | Sarkis | H04L 1/0082 |
| 2020/0084592 A1* | 3/2020 | Gulati | H04L 1/0052 |
| 2020/0145139 A1* | 5/2020 | Merlin | H04L 1/1812 |
| 2020/0162187 A1* | 5/2020 | Zhang | H04L 1/0013 |
| 2020/0163140 A1* | 5/2020 | Mochizuki | H04L 5/0098 |
| 2020/0266932 A1* | 8/2020 | Yang | H04W 72/23 |
| 2020/0287814 A1* | 9/2020 | Zhao | G06N 3/084 |
| 2020/0304231 A1* | 9/2020 | Wu | H04L 1/0057 |
| 2020/0366317 A1* | 11/2020 | Myung | H03M 13/618 |
| 2020/0413316 A1* | 12/2020 | Isaksson | H04W 24/10 |
| 2021/0006342 A1* | 1/2021 | Zhao | G06N 3/08 |
| 2021/0022168 A1* | 1/2021 | Zhou | H04L 5/001 |
| 2021/0027170 A1* | 1/2021 | Ye | H04L 43/55 |
| 2021/0135785 A1* | 5/2021 | Robert Safavi | H04L 1/0061 |
| 2021/0320748 A1* | 10/2021 | Chen | H04L 1/0057 |
| 2021/0328718 A1* | 10/2021 | Chen | H04L 1/0057 |
| 2021/0329002 A1* | 10/2021 | Huh | G06F 21/32 |
| 2021/0376974 A1* | 12/2021 | Makki | H04L 1/0015 |
| 2022/0021469 A1* | 1/2022 | Veijalainen | H04B 17/29 |
| 2022/0069941 A1* | 3/2022 | Levitsky | H04L 1/0058 |
| 2022/0094464 A1* | 3/2022 | Olivés | G06N 3/08 |
| 2022/0158773 A1* | 5/2022 | Kim | H04L 1/1848 |
| 2022/0190883 A1* | 6/2022 | Kaya | H04W 36/085 |
| 2024/0031090 A1* | 1/2024 | Elshafie | H04W 52/383 |
| 2024/0063819 A1* | 2/2024 | Parthasarathy | H03M 13/1128 |
| 2024/0187824 A1* | 6/2024 | Wu | H04W 4/06 |
| 2024/0313806 A1* | 9/2024 | Steiner | H03M 13/1105 |

(56) References Cited

OTHER PUBLICATIONS

Intellectual Property India, "Examination Report under sections 12 & 13 of the Patents Act" issued Dec. 6, 2021, in connection with Indian Patent Application No. 201941042232, 5 pages.

3GPP TS 36.213 V15.6.0 (Jun. 2019) Technical Specification; 3rd Generation Partnership Project; Technical Specification Group Radio Access Network; Evolved Universal Terrestrial Radio Access (E-UTRA); Physical layer procedures (Release 15); 551 pages.

3GPP TS 36.211 V15.6.0 (Jun. 2019) Technical Specification; 3rd Generation Partnership Project; Technical Specification Group Radio Access Network; Evolved Universal Terrestrial Radio Access (E-UTRA); Physical channels and modulation (Release 15), 240 pages.

3GPP TS 36.212 V15.6.0 (Jun. 2019); Technical Specification; 3rd Generation Partnership Project; Technical Specification Group Radio Access Network; Evolved Universal Terrestrial Radio Access (E-UTRA); Multiplexing and channel coding (Release 15); 246 pages.

* cited by examiner

METHOD AND APPARATUS FOR ENABLING OPTIMIZED DECODING OF DATA PACKET IN HARQ BASED COMMUNICATION

CROSS-REFERENCE TO RELATED APPLICATIONS

This application is a 371 of International Application No. PCT/KR2020/014124, filed Oct. 15, 2020, which claims priority to Indian Patent Application No. 201941042232, filed Oct. 18, 2019, and Indian Patent Application No. 201941042232, filed Oct. 14, 2020, the disclosures of which are herein incorporated by reference in their entirety.

BACKGROUND

1. Field

The present subject matter is related in general to Hybrid Automatic Repeat Request (HARQ) based communication in a wireless communication network, more particularly, but not exclusively relates to apparatus and method for enabling optimized decoding of data packet in HARQ based communication in a wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless system such as 4G, 5G and VRAN etc., Hybrid Automatic Repeat Request (HARQ) based transmission is used to improve the packet decoding probability. Once a packet is failed to decode by a Base Station (BS), several retransmissions of same packet may be been carried out till a positive ACK is being received by UE or a maximum number of retransmissions has occurred. To exploit these several retransmission, usually a chase combining scheme is employed at the BS for decoding. The chase combining technique includes soft combining of the received packets and may be viewed as Maximum Ratio Combining (MRC) technique. In the chase combining technique, all redundancy versions include same data bits of the packets and sequential combining may be performed. Buffer may be updated with weighted average LLR values in sequentially way for four iterations. If failure occurs for fourth time, the packet may be discarded and request for the same packet with different grant may be sent to transmitter.

The information disclosed in this background of the disclosure section is only for enhancement of understanding of the general background of the invention and should not be taken as an acknowledgement or any form of suggestion that this information forms the prior art already known to a person skilled in the art.

SUMMARY

Once a packet is failed to decode by a Base Station (BS), several retransmissions of same packet may be been carried out till a positive ACK is being received by UE or a maximum number of retransmissions has occurred.

In an embodiment, the present disclosure relates to a method for enabling optimized decoding of data packet in Hybrid Automatic Repeat Request (HARQ) based communication in a wireless communication network. The method includes to identify unsuccessful decoding of instant data packet received from a transmitting unit. If number of previous data packets, received preceding the instant data packet, is greater than one, the method includes to enable subsequent decoding in the receiving unit for the instant data packet. The subsequent decoding includes generating sequentially, one or more modified versions of data packets, for decoding. The one or more modified versions comprises all possible weighted combinations of the data packets with at least one of the instant data packet and one or more of the previous data packets.

Each of the one or more modified versions is decoded individually and a subsequent modified version from the one or more modified versions is generated when unsuccessful decoding is identified for previously generated modified version from the one or more modified versions.

In an embodiment, the present disclosure relates to apparatus for enabling optimized decoding of data packet in Hybrid Automatic Repeat Request (HARQ) based communication in a wireless communication network. The apparatus includes a processor and a memory communicatively coupled to the processor. The memory stores processor-executable instructions, which on execution cause the processor to identify unsuccessful decoding of instant data packet received from a transmitting unit. If number of previous data packets, received preceding the instant data packet, is greater than one, the processor is configured to enable subsequent decoding in the receiving unit for the instant data packet. The subsequent decoding includes generating sequentially, one or more modified versions of data packets, for decoding. The one or more modified versions comprises all possible weighted combinations of the data packets with at least one of the instant data packet and one or more of the previous data packets. Each of the one or more modified versions is decoded individually and a subsequent modified version from the one or more modified versions is generated when unsuccessful decoding is identified for previously generated modified version from the one or more modified versions.

The foregoing summary is illustrative only and is not intended to be in any way limiting. In addition to the illustrative aspects, embodiments, and features described above, further aspects, embodiments, and features will become apparent by reference to the drawings and the following detailed description.

According to the present disclosure, it is possible to optimize the decoding of data packets in HARQ-based communication in a wireless communication network.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
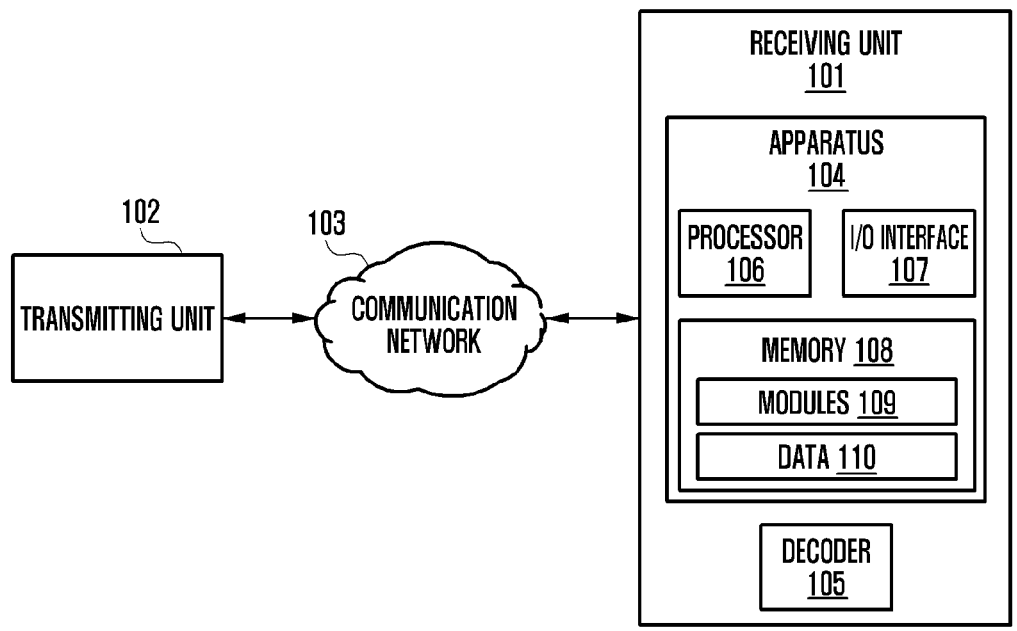
FIG. 1 shows exemplary environment of an apparatus for enabling optimized decoding of data packet in HARQ based communication in a wireless communication network, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to method and apparatus for enabling optimized decoding of data packet in HARQ based communication in a wireless communication network. Proposed method of decoding of the data packets includes to consider all possible weighted combinations of the data packets with at least one of instant data packet and one or more of the previous data packets, when unsuccessful decoding is identified. Each of one or more modified versions of the data packets is decoded individually and a subsequent modified version from the one or more modified versions is generated when unsuccessful decoding is identified for previously generated modified version from the one or more modified versions. Also, the proposed method provisions to perform health check of the data packets based on which a data packet may be discarded or considered for decoding and subsequent decoding. By the proposed method for decoding, probability of achieving a successful decoding is increased, leading to higher throughput. Also, the proposed method saves number of HARQ retransmissions and thus, saves transmit power and improves spectral efficiency.

FIG. 1 shows exemplary environment 100 including an apparatus 104 for enabling optimized decoding of data packet in HARQ based communication in a wireless communication network. In an embodiment, the apparatus may be implemented for Incremental redundancy HARQ combining technique as well any other combining schemes. The wireless communication network may include a transmitting unit 102 and a receiving unit 101 which are in communication via a communication network 103. In an embodiment, the communication network may be a telecommunication network to facilitate uplink communication and downlink communication. In an embodiment, the wireless communication network may be one of Wi-Fi, network, 4G network or 6G network and the apparatus 104 may be implemented in one of a Centralized Unit (CU), a Distributed Unit (DU), RAN Intelligent Controller (RIC), Open Radio Access Network (ORAN), Virtual Radio Access Network (VRAN), and Cloud Radio Access Network (CRAN). In an embodiment, each of the transmitting unit 102 and the receiving unit 101 may be one of a Base Station (BS), Remote Radio Head (RRH) and a User Equipment (UE). In an embodiment, the transmitting unit 102 and the receiving unit 101 may include any kind of transmitters and receivers. The HARQ based communication may be transmission and reception of data packets between the transmitting unit 102 and the receiving unit 101. The receiving unit 101 which receives the data packets, may be configured to decode the data packets using a decoder 105. The decoder 105 may be configured to decode the data packets using one or more techniques, known to a person skilled in the art. In an embodiment, the decoder 105 may be integral part of the apparatus 104. In an embodiment, the decoder 105 may either successfully decode a data packet or may not be able to decode the data packet.

In the uplink communication, the transmitting unit 102 may be the UE and the receiving unit 101 may be one of the BS and the RRH. The data packets may be transmitted from the UE to one of the BS and RRH. The data packets received by one of the BS and the RRH may be decoded at one of the BS and the RRH. In the downlink communication, the transmitting unit 102 may be one of the BS and RRH and the receiving unit 101 may be the UE. The data packets may be transmitted from one of the BS and RRH to the UE. The data packets received by one of the UE may be decoded at the UE. In some embodiment, the data packets received by the receiving unit 101 may not be successfully decoded. In such scenarios, the proposed apparatus 104 at the receiver end enables optimized decoding of the data packets received by the receiving unit 101.

The claimed apparatus 104 may be associated with the receiving unit 101 to enable optimized decoding of the data packets. As shown in FIG. 1, the apparatus 104 may be integral part of the receiving unit 101. In an embodiment, the apparatus 104 may be communicatively coupled with the receiving unit 101, to enable the optimized decoding. In such embodiment, the apparatus 104 may be a dedicated server or a cloud-based sever, in communication with the receiving unit 101. Also, the apparatus 104 may communicate with the receiving unit 101 via a communication network (not shown in figure). The communication network may include, but is not limited to, a direct interconnection, a Peer to Peer (P2P) network, Local Area Network (LAN), Wide Area Network (WAN), wireless network (e.g., using Wireless Application Protocol), Controller Area Network (CAN), the Internet, WiFi, and such. In some embodiment, when the receiving unit 101 is one of the BS and the RRH, the apparatus 104 may be integral part of VRAN/CRAN systems associated with the BS or the RRH.

The apparatus 104 which is configured to enable the optimized decoding in the HARQ communication may include one or more processors 106, Input/Output (I/O) interface 107 and a memory 108. In some embodiments, the memory 108 may be communicatively coupled to the one or more processors 106. The memory 108 stores instructions, executable by the one or more processors 106, which on execution, may cause the apparatus 104 to enable the optimized decoding. In an embodiment, the memory 108 may include one or more modules 109 and data 110. The one or more modules 109 may be configured to perform the steps of the present disclosure using the data 110, to enable the optimized decoding. In an embodiment, each of the one or more modules 109 may be a hardware unit which may be outside the memory 108 and coupled with the apparatus 104. In an embodiment, the apparatus 104 may be implemented in a variety of computing systems, such as a laptop computer, a desktop computer, a Personal Computer (PC), a notebook, a smartphone, a tablet, e-book readers, a server, a network server, cloud server and the like.

For enabling the optimized decoding, initially the apparatus 104 may be configured to perform health check of an instant data packet received from the transmitting unit 102. Such health check may be performed before decoding is performed on the data packet. For performing the health check of the instant data packet, the apparatus 104 may be configured to identify a Signal to Interference plus Noise Ratio (SINR) associated with the instant data packet. The SINR may represent difference between the received instant data packet and noise related to the wireless communication network. One or more techniques, known to a person skilled in the art, may be implemented in the apparatus 104 to identify the SINR of the instant data packet. Upon identification, the SINR may be compared with an optimal SINR range associated with at least one of the receiver unit 101 and the transmitting unit 102.

In an embodiment, the optimal SINR range may be determined using a trained neural network model based on one or more factors related to the wireless communication network. In an embodiment, the trained neural network model may be implemented using a deep learning neural network or a machine learning model or artificial intelligence module. Such neural network may be trained using belief propagation algorithm to determine the optimal SINR range. In an embodiment, the trained neural network may be a software module or hardware module. Such trained neural network may run in CU or DU or RIC or any intelligence module. One can derive rule-based formulas using algorithms in the trained module. In an embodiment, the one or more factors may include, but are not limited to, time of reception of instant data packet, ID associated with the receiving unit 101 and the transmitting unit 102, frequency of operation and bandwidth paths between the receiving unit 101 and the transmitting unit 102, day details related to communication between the receiving unit 101 and the transmitting unit 102, place of location of the receiving unit 101 and the transmitting unit 102, density of traffic in the wireless communication network, distribution of the traffic, climate conditions related to the receiving unit 101 and the transmitting unit 102, special occasions like festivals and functions, calendar based events. vacation details of users of at least one of the receiving unit 101 and the transmitting unit 102, information like type, category, monthly package related to the receiving unit 101 and the transmitting unit 102, data type information related to the instant data packet, measurements, offers in malls/movie release dates, sports/school/office events, Quality of Service (QoS) and QOS Class Identifier (QCI), capability information related to the wireless communication network, the receiving unit 101 and the transmitting unit 102 and the like. One or more other factors influencing the communication of the instant data packet between the receiving unit 101 and the transmitting unit 102, may be considered by the trained neural network model, for determining the optimal SINR range. In an embodiment, the optimal SINR range may vary based on at least one of the receiving unit 101 and the transmitting unit 102. The optimal SINR range may include optimal value of SINR that is desirable by the receiving unit 101 and the transmitting unit 102, for communicating the instant data packet, with acceptable deviations in the optimal value. It may be desirable that the SINR of the instant data packet is within the optimal SINR range or greater than maximum value in the optimal SINR range. However, when the SINR is lesser than minimum value in the optimal SINR range, it may be identified that such instant data packet is not healthy and may be corrupted to perform successful decoding. Hence, the apparatus 104 may be configured to discard the instant data packet to abort decoding of the instant data packet. By which unnecessary decoding of an unhealthy data packet may be eliminated. Upon discarding the instant data packet, the apparatus may be configured to initiate transmission of a Non-Acknowledgement (NACK) message to the transmitting unit 102 from the receiving unit 101.

Upon the health check, when the SINR of the instant data packet is greater than the optimal SINR range, the apparatus 104 may be configured to provide the instant data packet to the decoder 105 for decoding. Such instant data packet may be used for subsequent decoding as well. In an embodiment, upon the health check, each of the data packets may be provided with a reward based in the identified SINR. Higher reward may be provided for higher SINR values and lower reward may be provided for lower SINR values. Based on the reward, the data packet may be either discarded or provided for decoding. In case even after the health check, the instant data packets are not decoding successfully, the apparatus 104 may be configured to identify unsuccessful decoding of the instant data packet. The unsuccessful decoding may be identified when the decoder 105 is unable to decode the data packet received from the transmitting unit. In an embodiment, the decoder 105 may be communicatively coupled to the apparatus 104 to provide information related to the unsuccessful decoding. Such information may aid in activation of the apparatus 104 to enable optimized decoding of the data packets received from the transmitting unit.

Upon identifying the unsuccessful decoding, if the number of previous data packets received by the receiver unit from the transmitting unit, received preceding the instant data packet, is lesser than one, the apparatus 104 may be configured to initiate transmission of a Non-Acknowledgement (NACK) message to the transmitting unit 102 from the receiving unit 101. The NACK message may aid in retransmission of redundant version of the data packet from the transmitting unit.

In case the number of previous data packets is greater than one, the processor is configured to enable subsequent decoding in the receiving unit 101 for the instant data packet. The subsequent decoding includes generating sequentially, one or more modified versions of data packets, for decoding. In an embodiment, the one or more modified versions of the data packets are generated in a predetermined order. The one or more modified versions comprises all possible weighted combinations of the data packets with at least one of the instant data packet and one or more of the previous data packets. In an embodiment, all possible weighted combination may include to consider all combinations of the data packets. The previous data packets may not include data packets which were discarded upon the health check by the apparatus. In an embodiment, weights associated with the weighted combination of the data packets is determined using the learning model. In an embodiment, the learning model may be a machine learning model or Artificial Intelligence (AI) module which are configured to provide optimal weights. In an embodiment, the learning model may be a software module or hardware module. Such trained neural network may run in CU or DU or RIC or any intelligence module. One can derive rule-based formulas using algorithms in the trained module. Such optimal weights may be used for generating the weighted combinations of the data packets. The weights may be numeral values multiplied with each of the data packets considered for generating the modified versions. In an embodiment, the weights may be selected based on one or more parameters affecting the wireless communication network. In an embodiment, the weights provided by the learning model may be function of the one or more parameters. One or more parameters may include, but is not limited to, SINR, Log Likelihood Ratios (LLR) related to the data packets, neighboring Base Station (BS) interference expected values, BS topology, capabilities of either the receiving unit 101 or the transmitting unit 102, the ACK/NACK stats and so on. Any other parameters affecting the wireless communication network may be used by the learning model to provide the optimal weights for generating the weighted combination of the data packets. In an embodiment, the one or more parameters may also include previously described the one or more factors related to the wireless communication network. The weights associated with the weighted combination may be termed as function of each of such one or more parameters. For example, the weights may function of the SINR. Consider f(SINR) as weight, where f can be linear or concave function. One can use weights for multiplying IQ samples or LLR samples or any other intermediate module input or output. In an embodiment, the function may be f(SINR, load of the other BSs, UE location, interference, other wireless parameters) or sub-set of the one or more parameters).

In an embodiment, the learning model may be trained with all possible weights which may be discrete set or continuous set. If the SINR of combined packet increases, then the reward for the weights provided for the data packets may be higher. In case the SINR of combined packet decreases, the weights provided for the data packets may be lower.

In an embodiment, each of the one or more modified versions, upon generation, may be provided to the decoder 105 for individually decoding corresponding modified version. Information related to the decoding of the corresponding modified version may be provided to the apparatus 104 by the decoder 105. The information may include either successfully decoding or the unsuccessful decoding of the corresponding modified version. The apparatus 104 may be configured to generate a subsequent modified version from the one or more modified versions, when unsuccessful decoding is identified for previously generated modified version from the one or more modified versions. In an embodiment, the apparatus 104 may be configured to store each of the one or more modified versions of the data packets. In an embodiment, the stored modified version may be used for generating the subsequent modified version.

In an embodiment, the apparatus 104 may be configured to initiate transmission of the NACK message to the transmitting unit 102 from the receiving unit 101, when no possible combinations of the data packets is available for generating the one or more modified versions. In an embodiment, the apparatus 104 may be configured to abort the subsequent decoding when the number of previous data packets is one of greater and equal to a predefined retransmission threshold.

In an embodiment, the apparatus 104 may be configured to initiate transmission of an Acknowledgement (ACK) message to the transmitting unit 102 from the receiving unit 101 when one of the instant data packet and the one or more modified versions of the data packet is decoded successfully. In such case, the decoder 105 may be configured to provide information related to the successful decoding to the apparatus 104 to initiate the transmission of the ACK message.

In an embodiment, the apparatus 104 may receive data for enabling optimized decoding via the I/O interface 107. The received data may include, but is not limited to, at least one of data packets from the transmitting unit, information related to the decoding from the decoder 105 and so on. Also, the apparatus 104 may transmit data, for enabling optimized decoding, via the I/O interface 107. The transmitted data may include, but is not limited to, the one or more modified versions of the data packets, NACK/ACK messages and so on.

Figure 2:
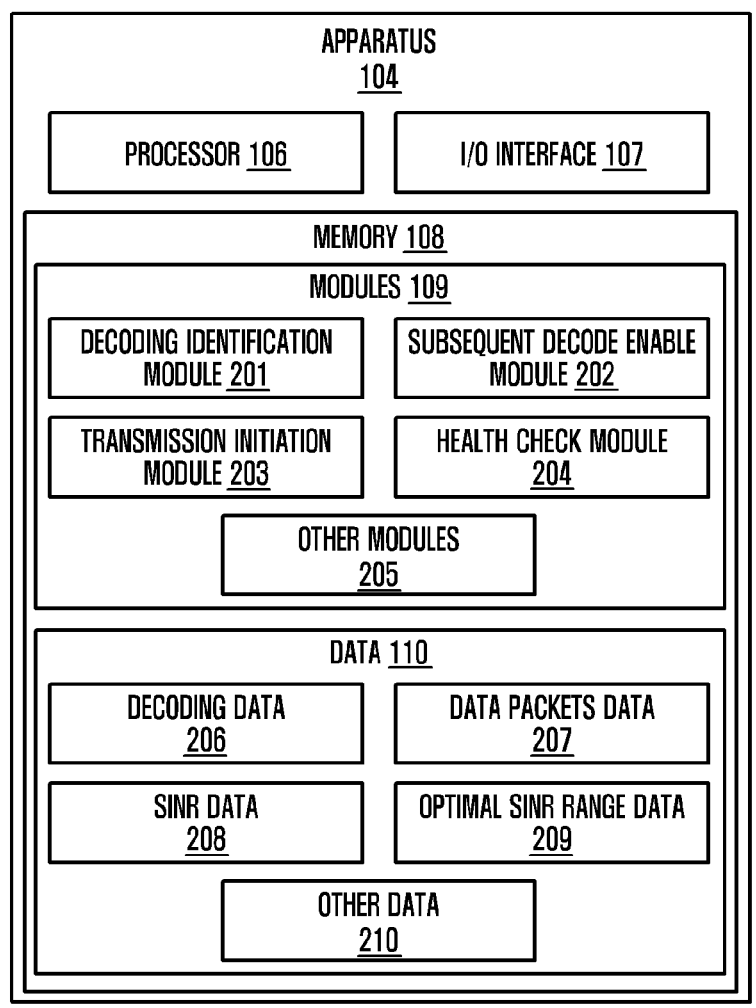
FIG. 2 shows a detailed block diagram of an apparatus for enabling optimized decoding of data packet in HARQ based communication in a wireless communication network, in accordance with some embodiments of the present disclosure.

FIG. 2 shows a detailed block diagram of the apparatus 104 for enabling the optimized decoding of the data packet in the HARQ based communication in the wireless communication network, in accordance with some embodiments of the present disclosure;

The data 110 and the one or more modules 109 in the memory 108 of the apparatus 104 is described herein in detail.

In one implementation, the one or more modules 109 may include, but are not limited to, a decoding identification module 201, a subsequent decode enable module 202, a transmission initiation module 203, a health check module 204 and one or more other modules 205, associated with the apparatus 104.

In an embodiment, the data 110 in the memory 108 may include decoding data 206, data packets data 207, SINR data 208, optimal SINR range data 209 and other data 210 associated with the apparatus 104.

In an embodiment, the data 110 in the memory 108 may be processed by the one or more modules 109 of the apparatus 104. In an embodiment, the one or more modules 109 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The one or more modules 109 of the present disclosure function to enable the optimized decoding of the data packet. The one or more modules 109 along with the data 110, may be implemented in any system, for enabling the optimized decoding. Working of the one or more modules is explained in conjunction with explanation of FIG. 3 and FIGS. 4a-4q.

Figure 3:
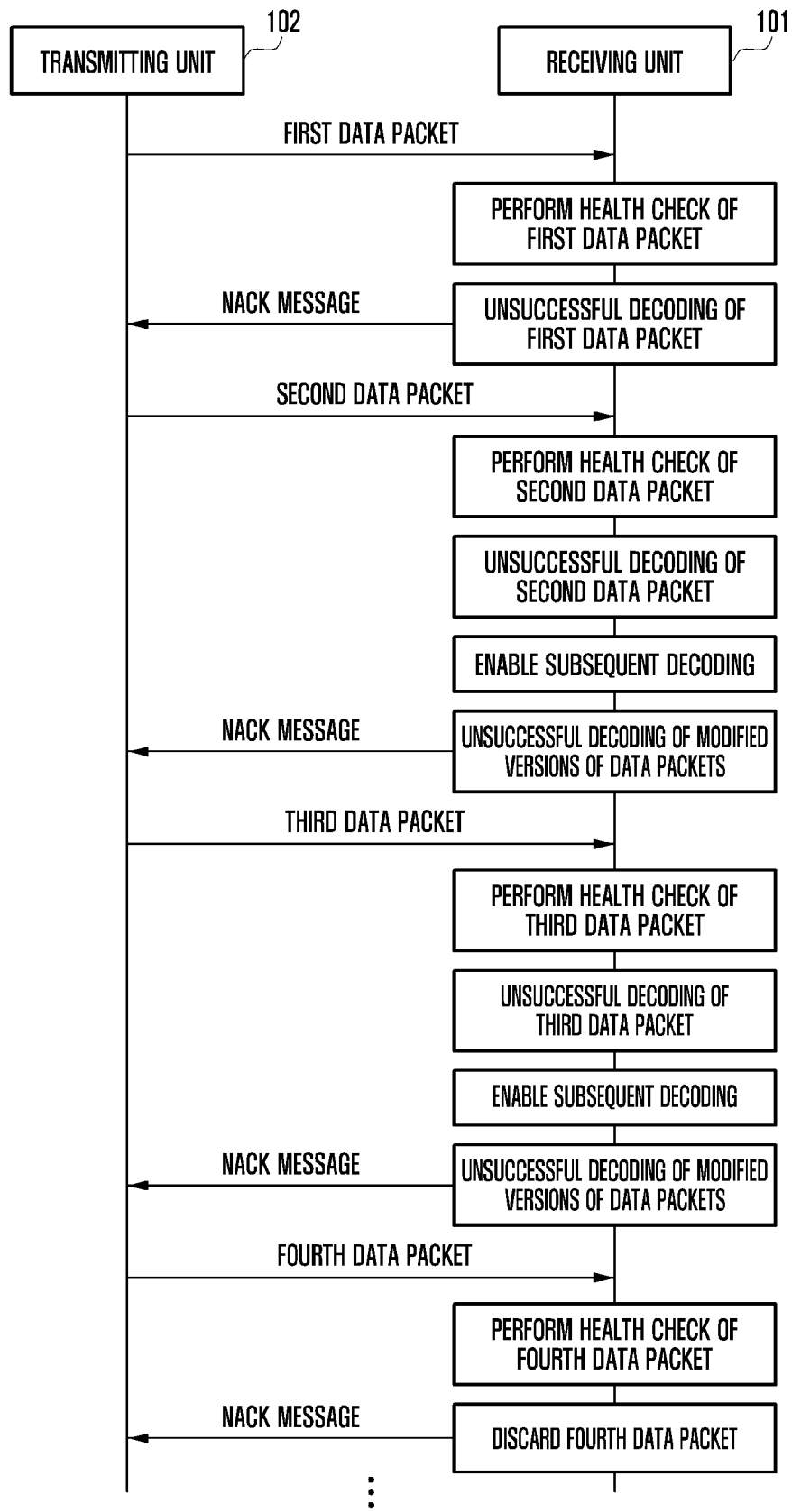
FIG. 3 illustrates schematic diagram for enabling optimized decoding of data packet in HARQ based communication in a wireless communication network, in accordance with some embodiments of present disclosure.

FIG. 3 illustrates exemplary schematic diagram for enabling the optimized decoding, in accordance with some embodiments of present disclosure. Consider the transmitting unit 102 102 is configured to transmit data packets to the receiving unit 101.

Figure 4A:
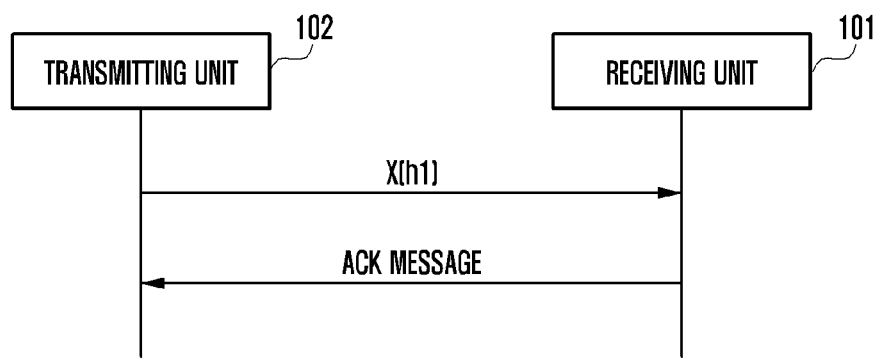
FIGS. 4a-4q illustrate exemplary embodiments of an apparatus for enabling optimized decoding of data packet in HARQ based communication in a wireless communication network, in accordance with some embodiments of present disclosure.

Initially, a first data packet may be transmitted by the transmitting unit 102 to the receiver unit 101. The receiving unit 101, upon reception of the first data packet, may provide the first data packet to the apparatus 104. The health check module 204 of the apparatus 104 may be configured to perform the health check of the first data packet. When SINR of the first data is lesser than the optimal SINR range, the first data packet may be discarded (not shown in figure). Further, the transmission initiation module 203 may be configured to initiate transmission of the NACK message to the transmitting unit 102. In case the SINR is within the optimal SINR range or greater than the maximum value in the optimal SINR range, the first data packet may be provided for decoding. When the first data is successfully decoded, the receiver unit may be configured to send the ACK message to the transmitting unit. In an embodiment, by receiving the ACK message, the transmitting unit 102 may infer that the first data packet was successfully decoded. Thus, retransmission of redundant version of the first data packet may be aborted at the transmitting unit. For example, consider the first data packet as X(h1) which is transmitted from the transmitting unit 102 to the receiving unit 101 with channel gain of h1, as shown in FIG. 4a. In the embodiment of FIG. 4a, the first data packet X(h1) is successfully decoded. Hence, the transmission initiation module 203 may be configured to initiate transmission of the ACK message from the receiving unit 101 to the transmitting unit 102.

Figure 4B:
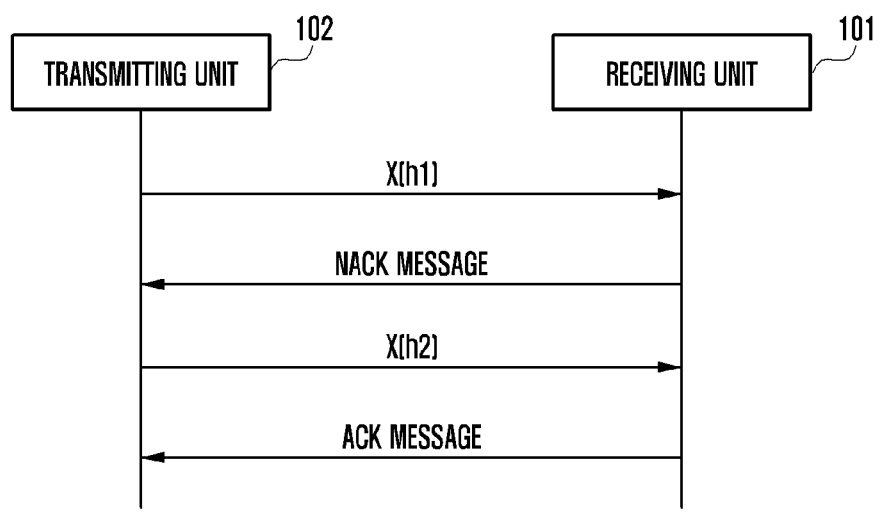

Referring back to FIG. 3, when the first data packet is not successfully decoded, unsuccessfully decoding of the first data packet may be identified. The decoding identification module 201 in the apparatus 104 associated with the receiving unit 101 may be configured to identify unsuccessful decoding of instant data packet received from the transmitting unit. In the given scenario, the instant data packet in the first data packet. Upon identifying the unsuccessful decoding, the decoding identification module 201 may be configured to check if the number of previous data packets received preceding the instant data packet, is lesser than one. If the number of previous data packets is lesser than one, the transmission initiation module 203 of the apparatus 104 may be configured to initiate transmission of the NACK message to the transmitting unit 102 from the receiving unit 101. The NACK message may aid in retransmission of redundant version of the data packet from the transmitting unit. For example, as shown in FIG. 4b, when the data packet X(h1) was unsuccessfully decoded, since there are no preceding data packer received from the transmitting unit, the transmission initiation module 203 may transmit the NACK message to the transmitting unit 102. Upon receipt of the NACK message, the transmitting unit 102 may initiate retransmission of redundant version of the first data packet. Consider the redundant version of the first data packet to be second data packet. As shown in FIG. 4b, the second data packet is X(h2) which is transmitted from the transmitting unit 102 to the receiving unit 101 with channel gain of h2. When the second data packet is received by the receiving unit 101, the second data packet may be considered to be the instant data packet and the first data packet may be considered to previous data packet received preceding the instant data packet.

Figure 4C:
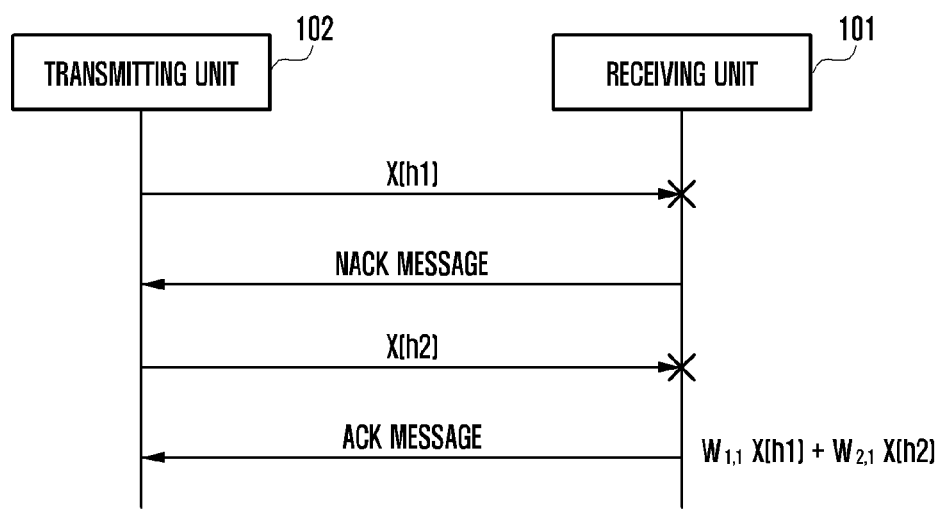

Upon receipt of the second data packet, the health check module 204 may be configured to perform health check of the second data packet. In case the SINR of the second data packet is within or greater than the optimal SINR range, the receiving unit 101 initiates decoding of the second data packet. When the second data packet is decoded successfully, the transmission initiation module 203 may initiate transmission of the ACK message from the receiving unit 101 to the transmitting unit. For example, as shown in FIG. 4b, when X(h2) is decoded successfully, the ACK message is sent to the transmitting unit. Upon, receipt of the ACK message, further retransmission may be aborted at the transmitting unit. However, when the decoding identification module 201 identifies unsuccessfully decoding of the second data packet, the decoding identification module 201 may further check if the number of previous data packets is greater than one. In this case, the number of previous data packets is equal to one. Hence, the subsequent decode enable module 202 may be configured to enable subsequent decoding in the receiving unit 101. The subsequent decode enable module 202 may be configured to generate sequentially, one or more modified versions of data packets, for subsequent decoding. The one or more modified versions comprises all possible weighted combinations of the data packets with at least one of the instant data packet and one or more of the previous data packets. For the given scenario, the one or more modified versions comprises all possible weighted combinations of the first data packet and the second data packet. For example, as shown in FIG. 4c, the weighted combination of X(h1) and X(h2) may be W1,1 X(h1)+W2,1 X(h2) (hereafter referred to as first weighted combination). Where W1,1 and W2,1 are weights associated with the first data packet and the second data packet, respectively.

Figure 4D:
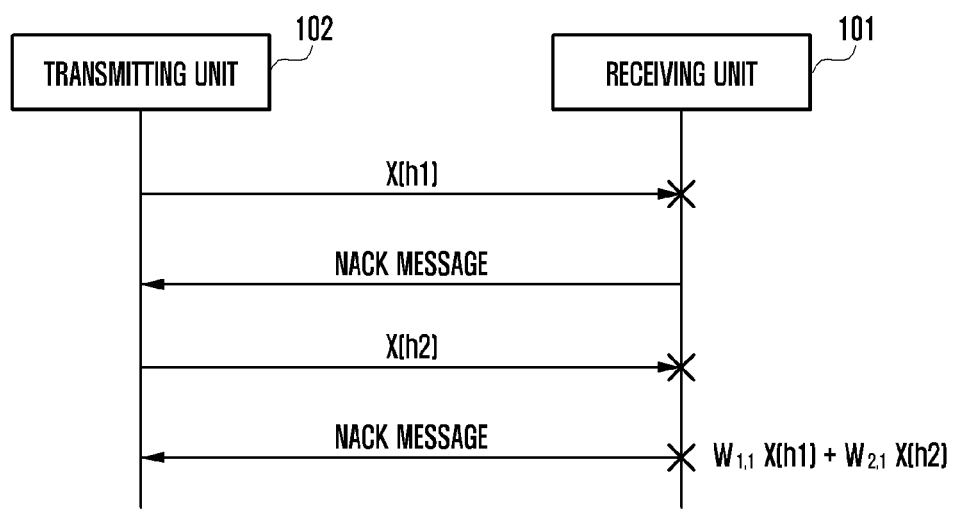

Upon generation of the first weighted combination, the receiving unit 101 initiates decoding of the first weighted combination. When the first weighted combination is decoded successfully, the transmission initiation module 203 may initiate transmission of the ACK message from the receiving unit 101 to the transmitting unit. For example, as shown in FIG. 4c, when W1,1 X(h1)+W2,1 X(h2) is decoded successfully, the ACK message is sent to the transmitting unit. Upon, receipt of the ACK message, further retransmission may be aborted at the transmitting unit. However, when the decoding identification module 201 identifies unsuccessfully decoding of the first weighted combination, since no possible combinations of the data packets is available for generating the one or more modified versions, the transmission initiation module 203 may transmit the NACK message to the transmitting unit 102 as shown in FIG. 4d.

Consider, during the health check, the SINR of the second data packet is lesser than the optimal SINR range. In that case, the second data packet may be discarded even before decoding the second data packet and the transmission initiation module 203 may initiate transmission of the NACK message to the transmitting unit 102. Hence, the one or more weighted combinations of the data packets may not be generated using the second data packet.

Figure 4E:
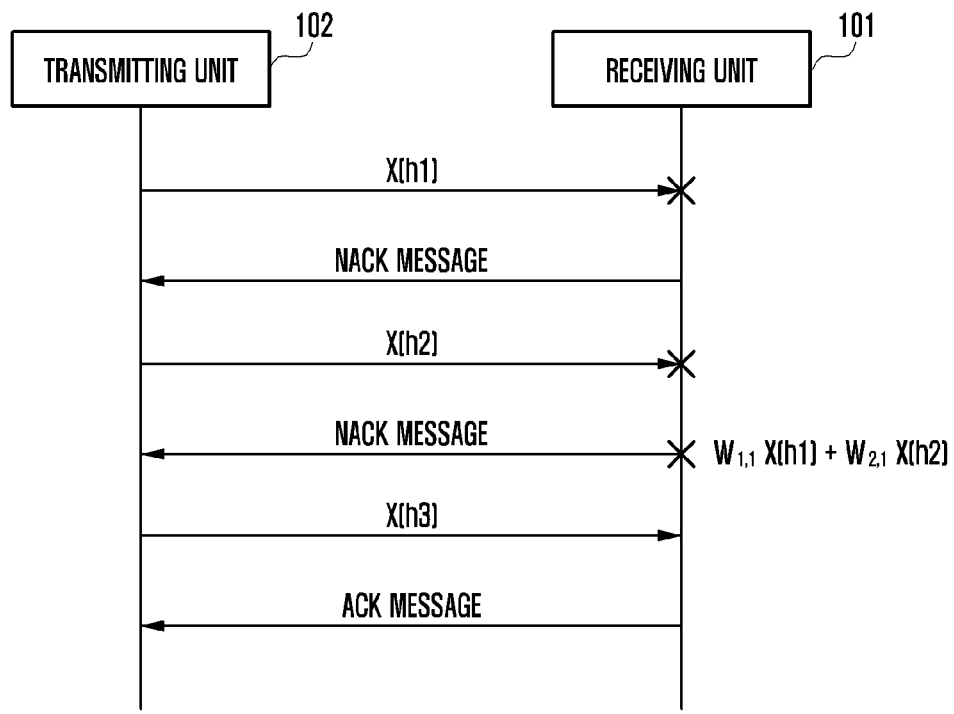

Upon receipt of the NACK message, the transmitting unit 102 may initiate retransmission of redundant version and send third data packet to the receiving unit 101. As shown in FIG. 4e, the third data packet is X(h3) which is transmitted from the transmitting unit 102 to the receiving unit 101 with channel gain of h3. When the third data packet is received by the receiving unit 101, the third data packet may be considered to be the instant data packet and the first data packet, and the second data packet may be considered to previous data packets received preceding the instant data packet.

Figure 4F:
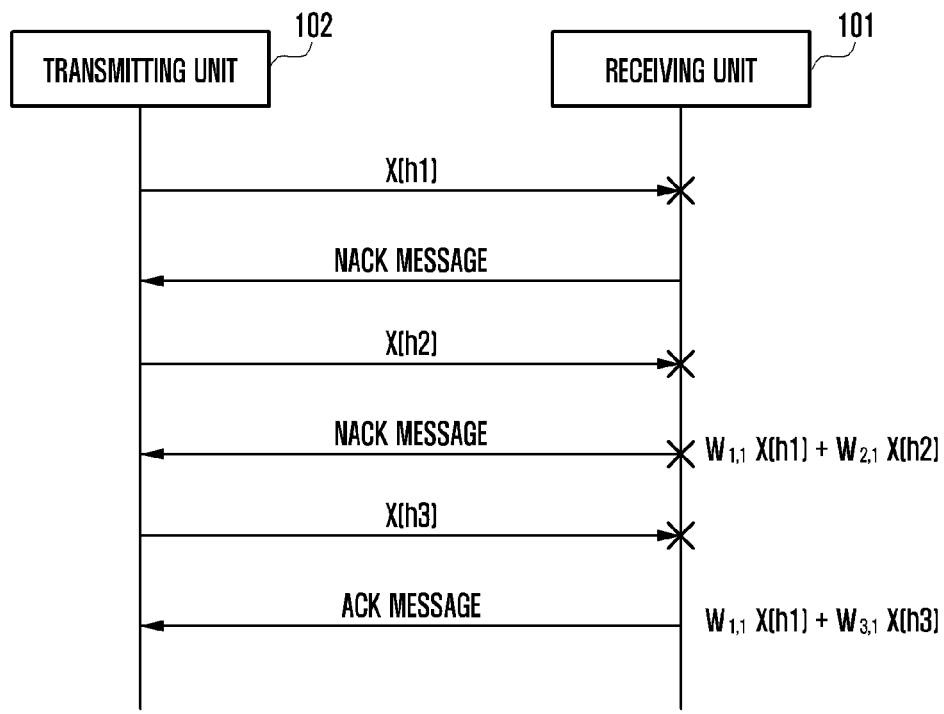

Upon receipt of the third data packet, the health check module 204 may be configured to perform health check of the third data packet. In case the SINR of the third data packet is within or greater than the optimal SINR range, the receiving unit 101 initiates decoding of the third data packet. When the third data packet is decoded successfully, the transmission initiation module 203 may initiate transmission of the ACK message from the receiving unit 101 to the transmitting unit. For example, as shown in FIG. 4e, when X(h3) is decoded successfully, the ACK message is sent to the transmitting unit. Upon, receipt of the ACK message, further retransmission may be aborted at the transmitting unit. However, when the decoding identification module 201 identifies unsuccessfully decoding of the third data packet, the decoding identification module 201 may further check if the number of previous data packets is greater than one. In this case, the number of previous data packets is equal to two. Hence, the subsequent decode enable module 202 may be configured to enable subsequent decoding in the receiving unit 101. The subsequent decode enable module 202 may be configured to generate sequentially, one or more modified versions of data packets, for subsequent decoding. The one or more modified versions comprises all possible weighted combinations of the data packets with at least one of the instant data packet and one or more of the previous data packets. For the given scenario, the one or more modified versions comprises all possible weighted combinations of the first data packet, the second data packet and the third data packet. In an embodiment, the one or more modified versions may be generated in the predetermined order. For example, initial weighted combinations may be using two data packets and subsequent combinations may include three data packets. For example, as shown in FIG. 4f, initial weighted combination generated for X(h1), X(h2) and X(h3) may be W1,1 X(h1)+W3,1 X(h3) (hereafter referred to as second weighted combination). Where W1,1 and W3,1 are weights associated with the first data packet and the third data packet, respectively.

Figure 4G:
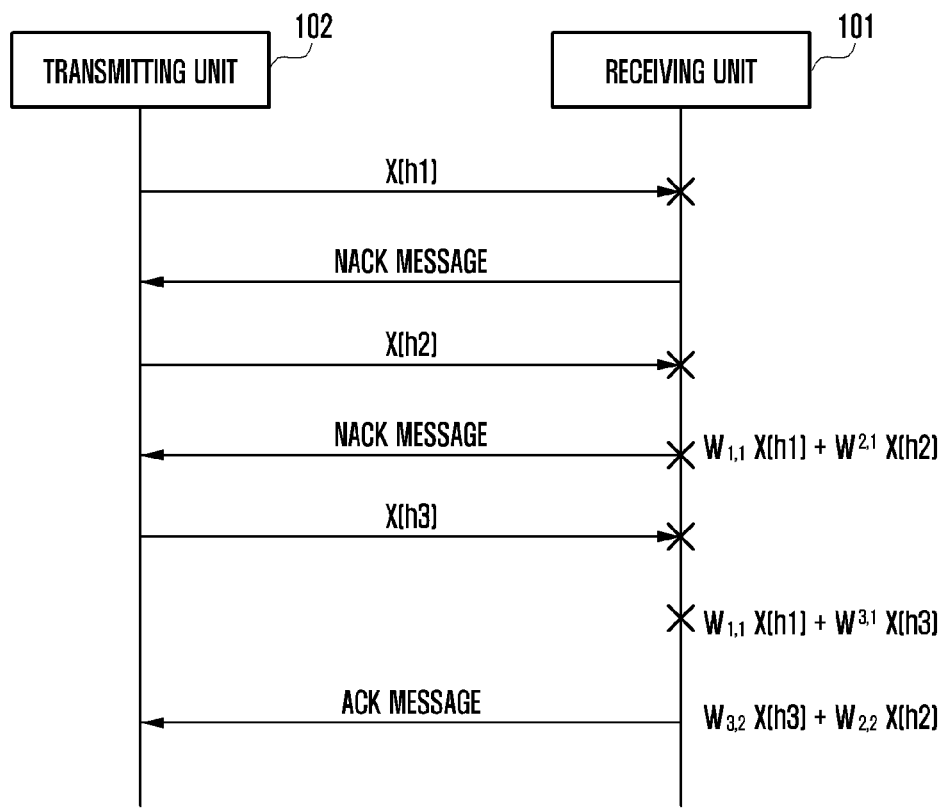
Figure 4H:
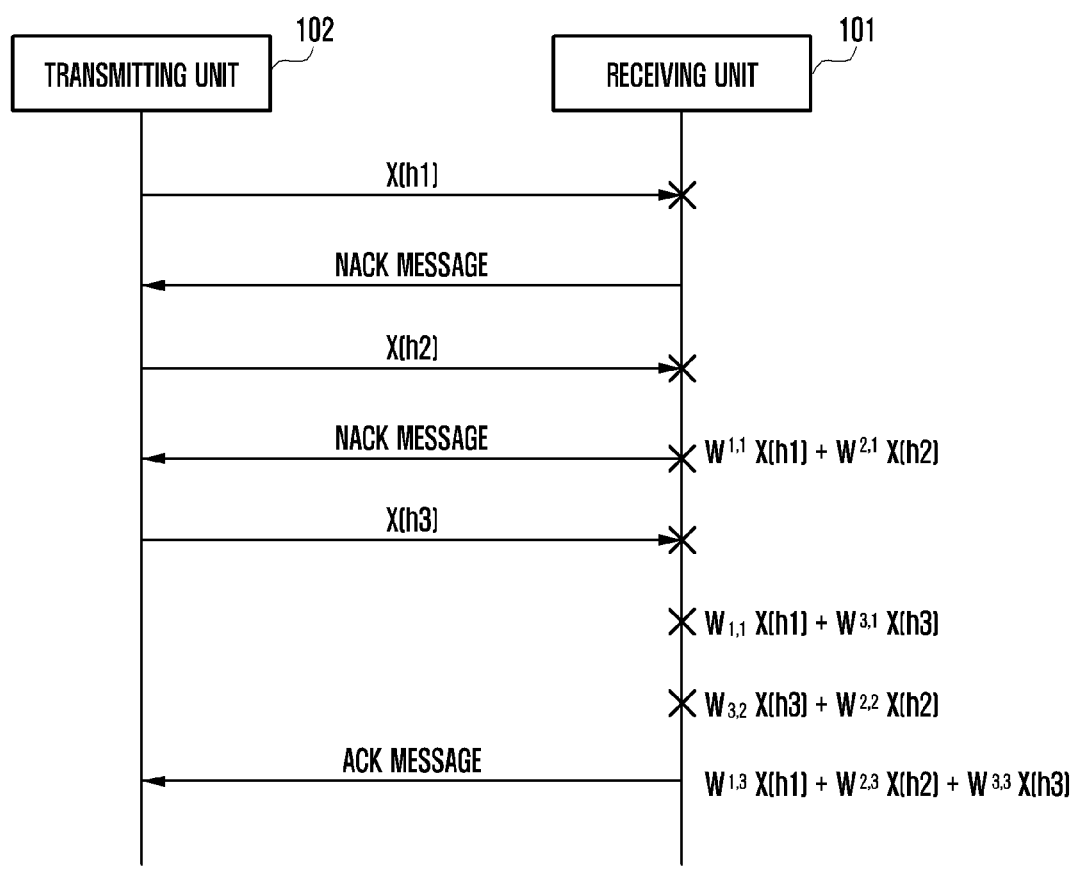
Figure 4I:
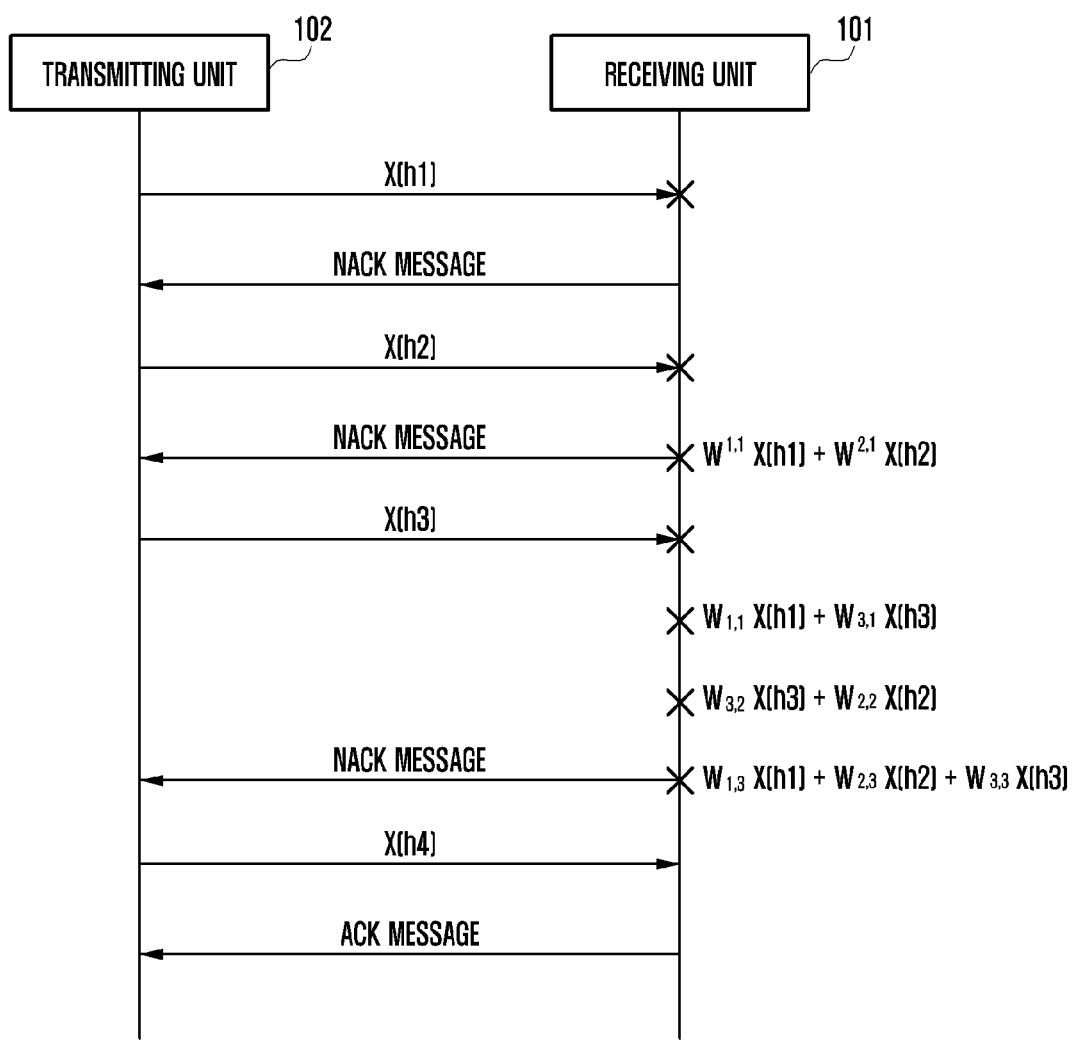

Upon generation of the second weighted combination, the receiving unit 101 initiates decoding of the second weighted combination. When the second weighted combination is decoded successfully, the transmission initiation module 203 may initiate transmission of the ACK message from the receiving unit 101 to the transmitting unit. For example, as shown in FIG. 4f, when W1,1 X(h1)+W3,1 X(h3) is decoded successfully, the ACK message is sent to the transmitting unit. Upon, receipt of the ACK message, further retransmission may be aborted at the transmitting unit. However, when the decoding identification module 201 identifies unsuccessfully decoding of the second weighted combination, subsequent weighted combination of the data packets may be generated. As shown in FIG. 4g, the subsequent weight combination generated for X(h1), X(h2) and X(h3) may be W3,2 X(h3)+W2,2 X(h2) (hereafter referred to as third weighted combination). Where W3,2 and W2,2 are weights associated with the third data packet and the second data packet, respectively. Upon generation of the third weighted combination, the receiving unit 101 initiates decoding of the second weighted combination. When the second weighted combination is decoded successfully, the transmission initiation module 203 may initiate transmission of the ACK message from the receiving unit 101 to the transmitting unit. For example, as shown in FIG. 4g, when W3,2 X(h3)+W2,2 X(h2) is decoded successfully, the ACK message is sent to the transmitting unit. Upon, receipt of the ACK message, further retransmission may be aborted at the transmitting unit. However, when the decoding identification module 201 identifies unsuccessfully decoding of the third weighted combination, subsequent weighted combination of the data packets may be generated. As shown in FIG. 4h, the subsequent weight combination generated for X(h1), X(h2) and X(h3) may be W1,3 X(h1)+W2,3 X(h2)+W3,3 X(h3) (hereafter referred to as fourth weighted combination). Where W1,3, W2,3 and W3,3 are weights associated with the first data packet, the second data packet and the third data packet, respectively. In an embodiment, the other modules of the apparatus 104 may be configured to store previous weighted combinations to generate the subsequent weighted combinations. Upon generation of the fourth weighted combination, the receiving unit 101 initiates decoding of the fourth weighted combination. When the fourth weighted combination is decoded successfully, the transmission initiation module 203 may initiate transmission of the ACK message from the receiving unit 101 to the transmitting unit. For example, as shown in FIG. 4h, when W1,3 X(h1)+W2,3 X(h2)+W3,3 X(h3) is decoded successfully, the ACK message is sent to the transmitting unit. Upon, receipt of the ACK message, further retransmission may be aborted at the transmitting unit. However, when the decoding identification module 201 identifies unsuccessfully decoding of the fourth weighted combination, since no possible combinations of the data packets is available for generating the one or more modified versions, the transmission initiation module 203 may transmit the NACK message to the transmitting unit 102 as shown in FIG. 4i.

Consider, during the health check, the SINR of the third data packet is lesser than the optimal SINR range. In that case, the third data packet may be discarded even before decoding the third data packet and the transmission initiation module 203 may initiate transmission of the NACK message to the transmitting unit 102. Hence, the one or more weighted combinations of the data packets may not be generated using the third data packet.

Upon receipt of the NACK message, the transmitting unit may initiate retransmission of redundant version and send fourth data packet to the receiving unit 101. As shown in FIG. 4i, the fourth data packet is X(h4) which is transmitted from the transmitting unit 102 to the receiving unit 101 with channel gain of h4. When the fourth data packet is received by the receiving unit, the fourth data packet may be considered to be the instant data packet and the first data packet, the second data packet and the third data packets may be considered to previous data packets received preceding the instant data packet.

Figure 4J:
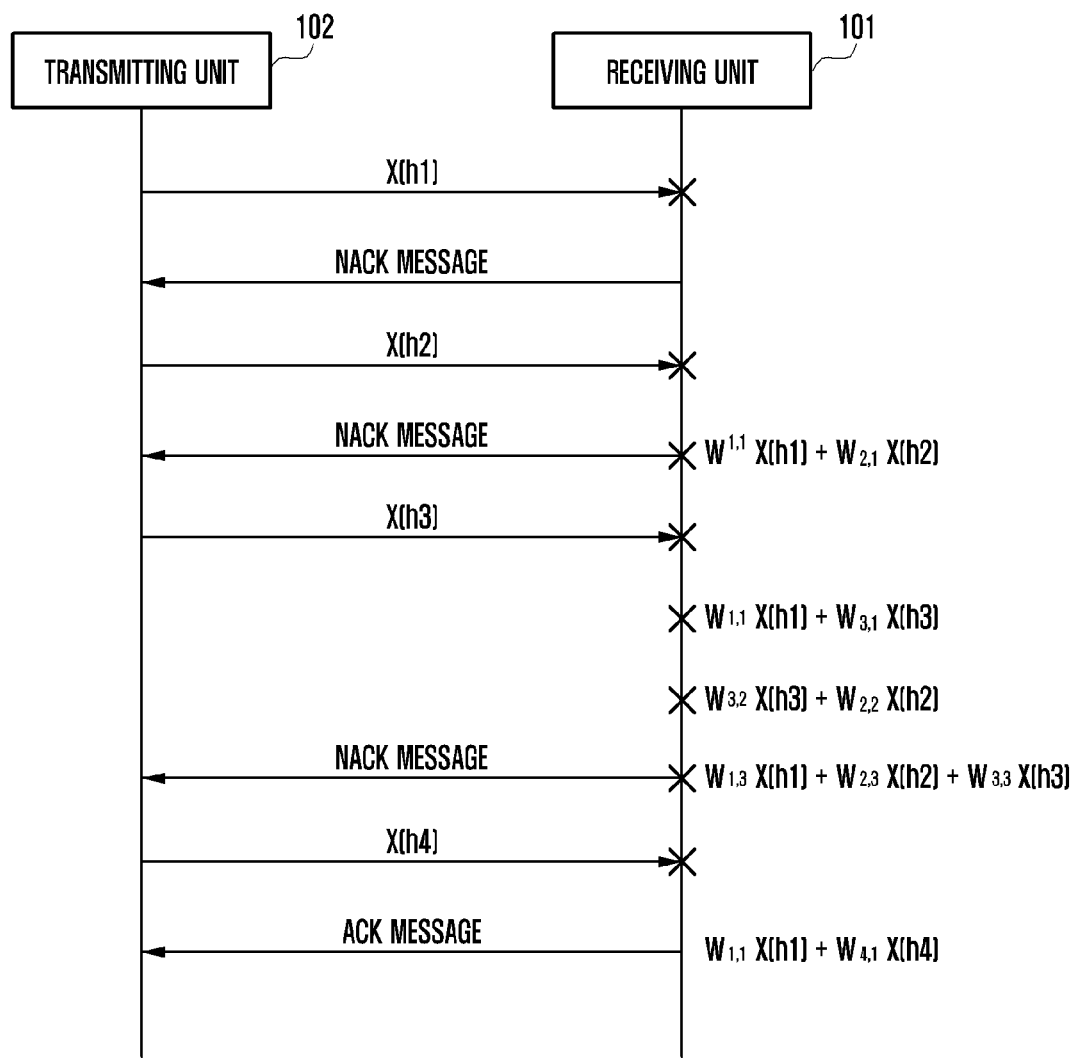

Upon receipt of the fourth data packet, the health check module 204 may be configured to perform health check of the fourth data packet. In case the SINR of the fourth data packet is within or greater than the optimal SINR range, the receiving unit 101 initiates decoding of the fourth data packet. When the fourth data packet is decoded successfully, the transmission initiation module 203 may initiate transmission of the ACK message from the receiving unit 101 to the transmitting unit. For example, as shown in FIG. 4i, when X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the fourth data packet, the decoding identification module 201 may further check if the number of previous data packets is greater than one. In this case, the number of previous data packets is equal to three. Hence, the subsequent decode enable module 202 may be configured to enable subsequent decoding in the receiving unit. The subsequent decode enable module 202 may be configured to generate sequentially, one or more modified versions of data packets, for subsequent decoding. For the given scenario, the one or more modified versions comprises all possible weighted combinations of the first data packet, the second data packet, the third data packet and the fourth data packets. In an embodiment, the predetermined order for generating the one or more modified versions with four data packets may include initially generated weighted combinations using two data packets, subsequent combinations may include three data packets and further weighted combinations may include four data packets. For example, as shown in FIG. 4j, initial weighted combination generated for X(h1), X(h2), X(h3) and X(h4) may be W1,1 X(h1)+W4,1 X(h4) (hereafter referred to as fifth weighted combination). Where W1,1 and W4,1 are weights associated with the first data packet and the fourth data packet, respectively.

Figure 4K:
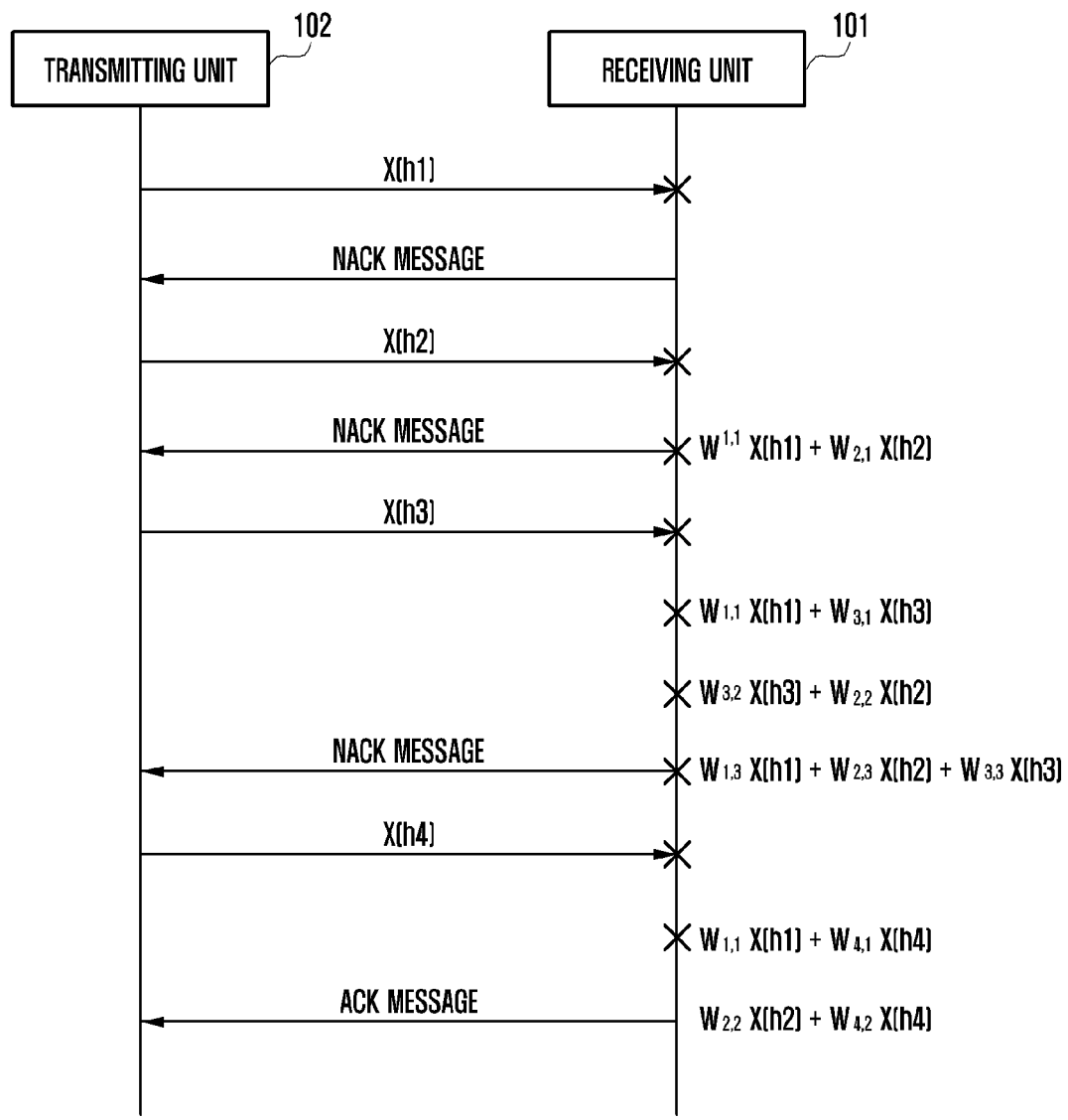
Figure 4L:
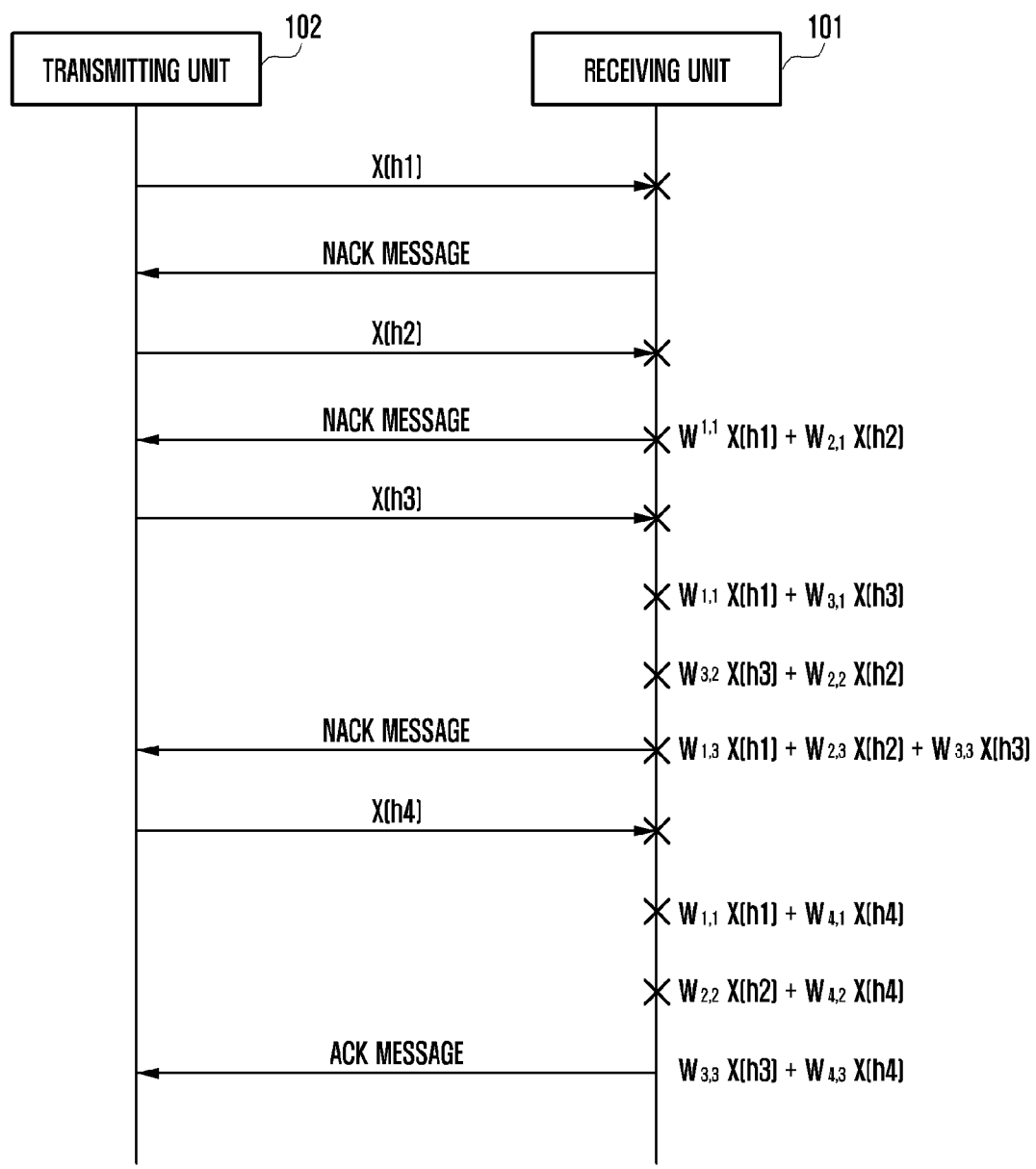
Figure 4M:
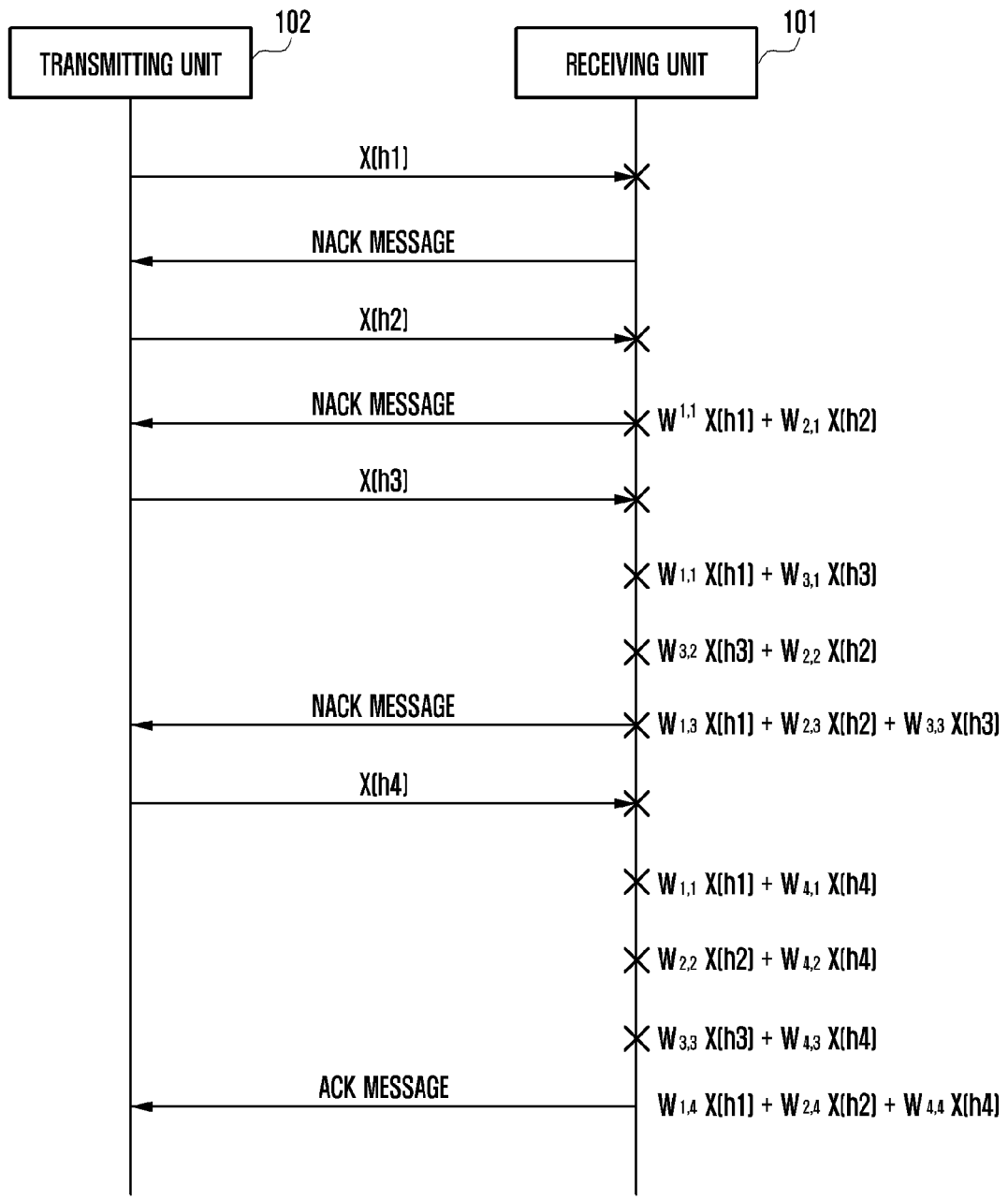
Figure 4N:
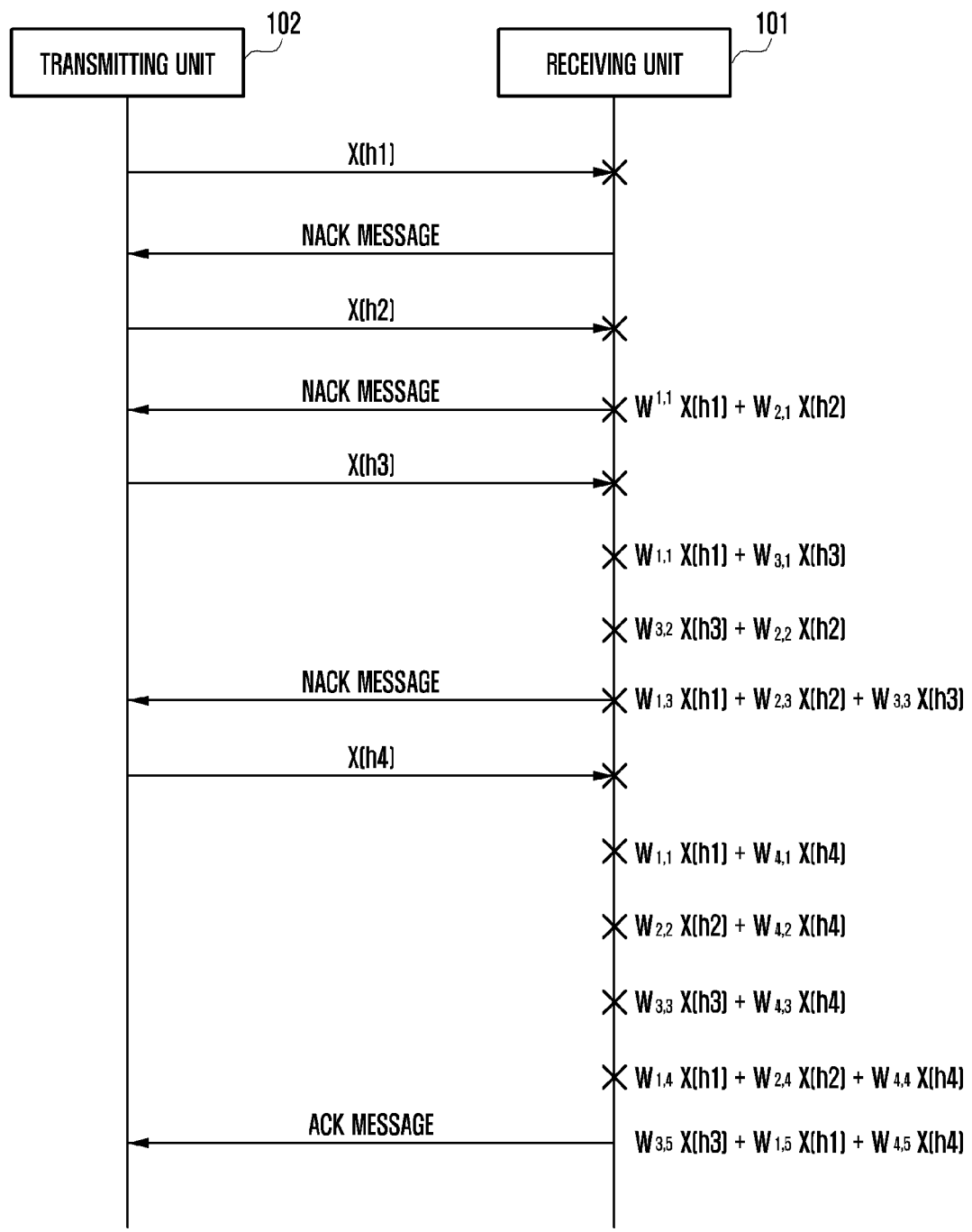
Figure 40:
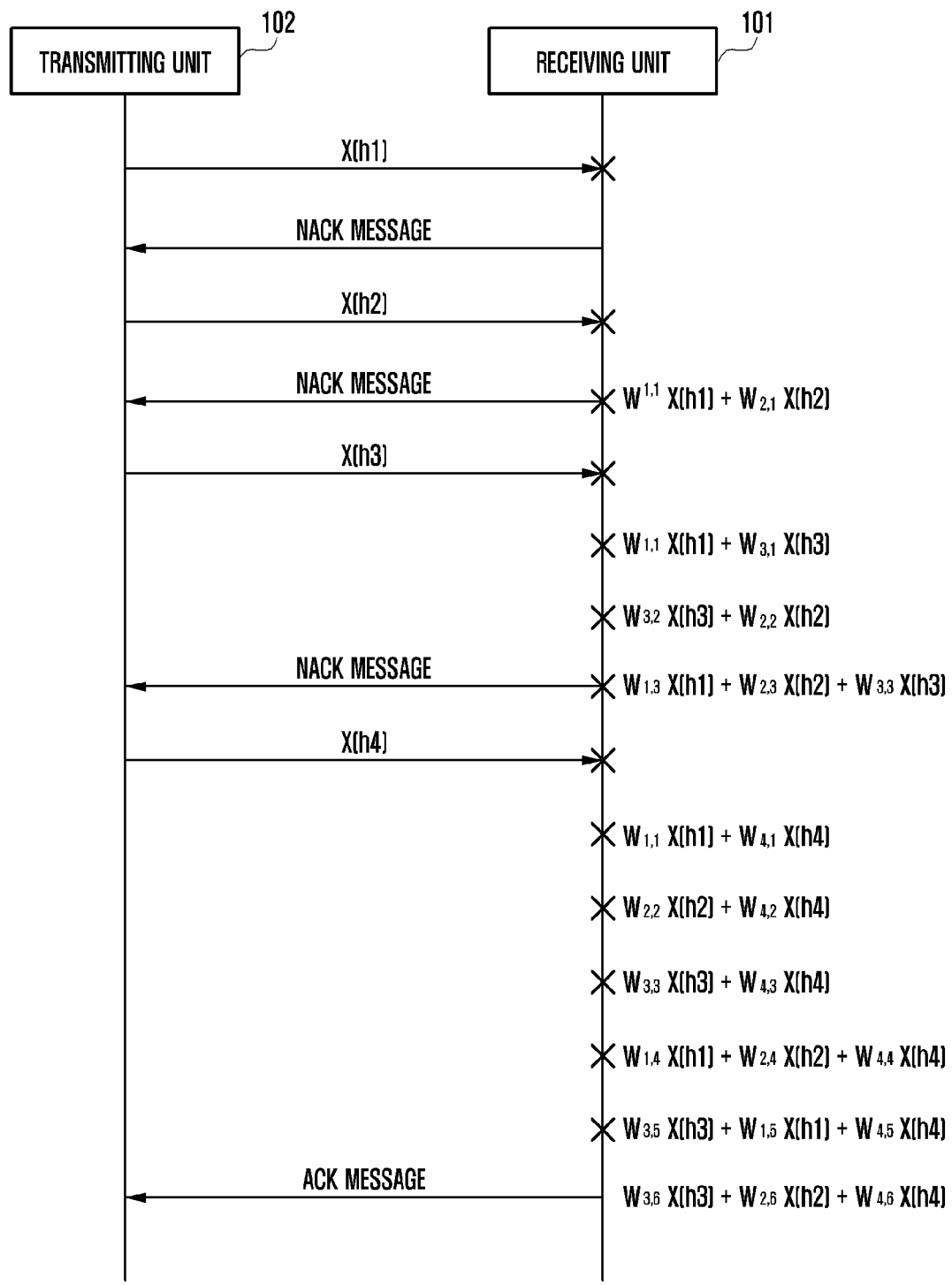
Figure 4P:
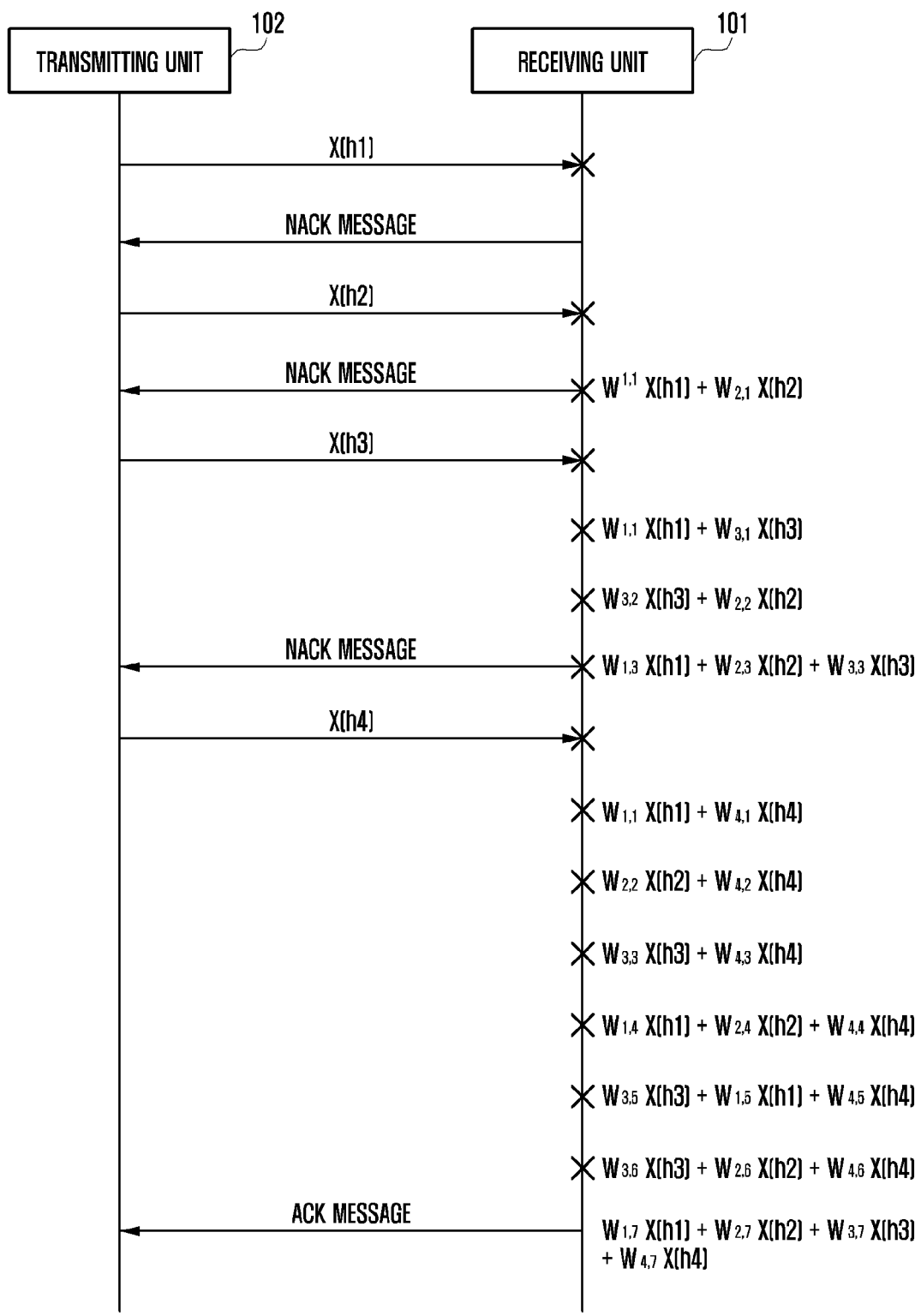

Upon generation of the fifth weighted combination, the receiving unit 101 initiates decoding of the fifth weighted combination. When the fifth weighted combination is decoded successfully, the transmission initiation module 203 may initiate transmission of the ACK message from the receiving unit 101 to the transmitting unit. For example, as shown in FIG. 4j, when W1,1 X(h1)+W4,1 X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the fifth weighted combination, subsequent weighted combination of the data packets may be generated. As shown in FIG. 4k, the subsequent weight combination generated for X(h1), X(h2), X(h3) and X(h4) may be W2,2 X(h2)+W4,2 X(h4) (hereafter referred to as sixth weighted combination). Where W2,2 and W4,2 are weights associated with the second data packet and the fourth data packet, respectively. Upon generation of the sixth weighted combination, the receiving unit 101 initiates decoding of the sixth weighted combination. When the sixth weighted combination is decoded successfully, the transmission initiation module 203 may initiate transmission of the ACK message from the receiving unit 101 to the transmitting unit. For example, as shown in FIG. 4k, when W2,2 X(h2)+W4,2 X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the sixth weighted combination, subsequent weighted combination of the data packets may be generated. As shown in FIG. 4l, the subsequent weight combination generated for X(h1), X(h2), X(h3) and X(h4) may be W3,3 X(h3)+W4,3 X(h4) (hereafter referred to as seventh weighted combination). Where W3,3, and W3,3 are weights associated with the third data packet, and the fourth data packet, respectively. Upon generation of the seventh weighted combination, the receiving unit 101 initiates decoding of the seventh weighted combination. When the seventh weighted combination is decoded successfully, the transmission initiation module 203 may initiate transmission of the ACK message from the receiving unit 101 to the transmitting unit. For example, as shown in FIG. 4l, when W3,3 X(h3)+W4,3 X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the seventh weighted combination, subsequent weighted combination of the data packets may be generated. As shown in FIG. 4m, the subsequent weight combination generated for X(h1), X(h2), X(h3) and X(h4) may be W1,4 X(h1)+W2,4 X(h2)+W4,4 X(h4) (hereafter referred to as eighth weighted combination). Where W1,4, W2,4 and W4,4 are weights associated with the first data packet, the second data packet and the fourth data packet, respectively. Upon generation of the eighth weighted combination, the receiving unit 101 initiates decoding of the eighth weighted combination. When the eighth weighted combination is decoded successfully, the transmission initiation module 203 may initiate transmission of the ACK message from the receiving unit 101 to the transmitting unit. For example, as shown in FIG. 4m, when W1,4 X(h1)+W2,4 X(h2)+W4,4 X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the eighth weighted combination, subsequent weighted combination of the data packets may be generated. As shown in FIG. 4m, the subsequent weight combination generated for X(h1), X(h2), X(h3) and X(h4) may be W1,4 X(h1)+W2,4 X(h2)+W4,4 X(h4) (hereafter referred to as eighth weighted combination). Where W1,4, W2,4 and W4,4 are weights associated with the first data packet, the second data packet and the fourth data packet, respectively. Upon generation of the eighth weighted combination, the receiving unit 101 initiates decoding of the eighth weighted combination. When the eighth weighted combination is decoded successfully, the transmission initiation module 203 may initiate transmission of the ACK message from the receiving unit 101 to the transmitting unit. For example, as shown in FIG. 4m, when W1,4 X(h1)+W2,4 X(h2)+W4,4 X(h4) is decoded successfully, the ACK message is sent to the transmitting unit. Upon, receipt of the ACK message, further retransmission may be aborted at the transmitting unit. However, when the decoding identification module 201 identifies unsuccessfully decoding of the eighth weighted combination, subsequent modified versions may be generated for decoding, sequentially. For each of said modified versions, the steps of the proposed method is performed. As shown in FIGS. 4n, 4o, 4p and 4q, the subsequent weighted combinations may be W3,5 X(h3)+W1,5 X(h1)+W4,5 X(h4) (hereafter referred to as ninth weighted combination), W3,6 X(h3)+W2,6 X(h2)+W4,6 X(h4) (hereafter referred to as tenth weighted combination) and W1,7 X(h1)+W2,7 X(h2)+W3,7 X(h3)+W4,7 X(h4) (hereafter referred to as eleventh weighted combination).

Figure 4Q:
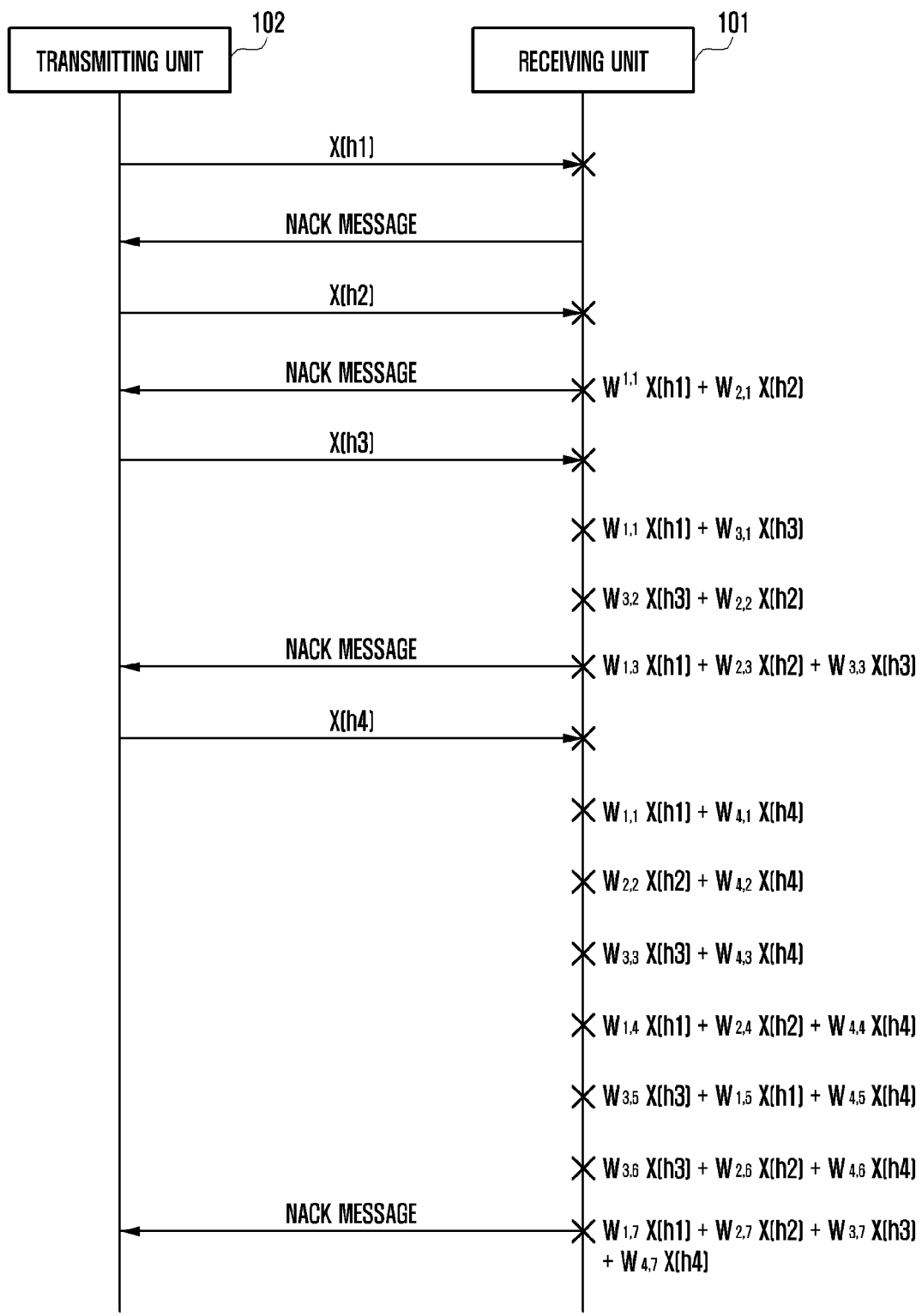

When all of the ninth weighted combination, the tenth weighted combination and the eleventh weighted combination is unsuccessfully decoded, since no possible combinations of the data packets is available for generating the one or more modified versions, the transmission initiation module 203 may transmit the NACK message to the transmitting unit 102 as shown in FIG. 4q. Consider the predefined retransmission threshold is four. Since number of data packets received by the receiving unit 101 is four, not further retransmission is initiated at the transmitting unit. In such case, a fresh transmission of data packets may be established between the receiving unit 101 and the transmitting unit.

Consider, during the health check, the SINR of the fourth data packet is lesser than the optimal SINR range. In that case, the fourth data packet may be discarded even before decoding the fourth data packet and the transmission initiation module 203 may initiate transmission of the NACK message to the transmitting unit 102. Hence, the one or more weighted combinations of the data packets may not be generated using the third data packet.

In an embodiment, information relating to successful decoding and unsuccessful decoding of each of the data packets and the one or more modifies versions may be stored as decoding data 205 in the memory 108. In an embodiment, the one or more modified versions of the data packets generated for the data packets received by the receiving unit 101 may be stored as the data packets data 206 in the memory 108. In an embodiment, the SINR identified for each of the data packets received by the receiving unit 101 may be stored as the SINR data 208 in the memory 108. In an embodiment, the optimal SINR range determined using the trained model may be stored as optimal SINR range data 209 in the memory 108.

The other data 207 may store data, including temporary data and temporary files, generated by modules for performing the various functions of the apparatus 104. The one or more modules 109 may also include other modules 204 to perform various miscellaneous functionalities of the apparatus 104. It will be appreciated that such modules may be represented as a single module or a combination of different modules.

Figure 5:
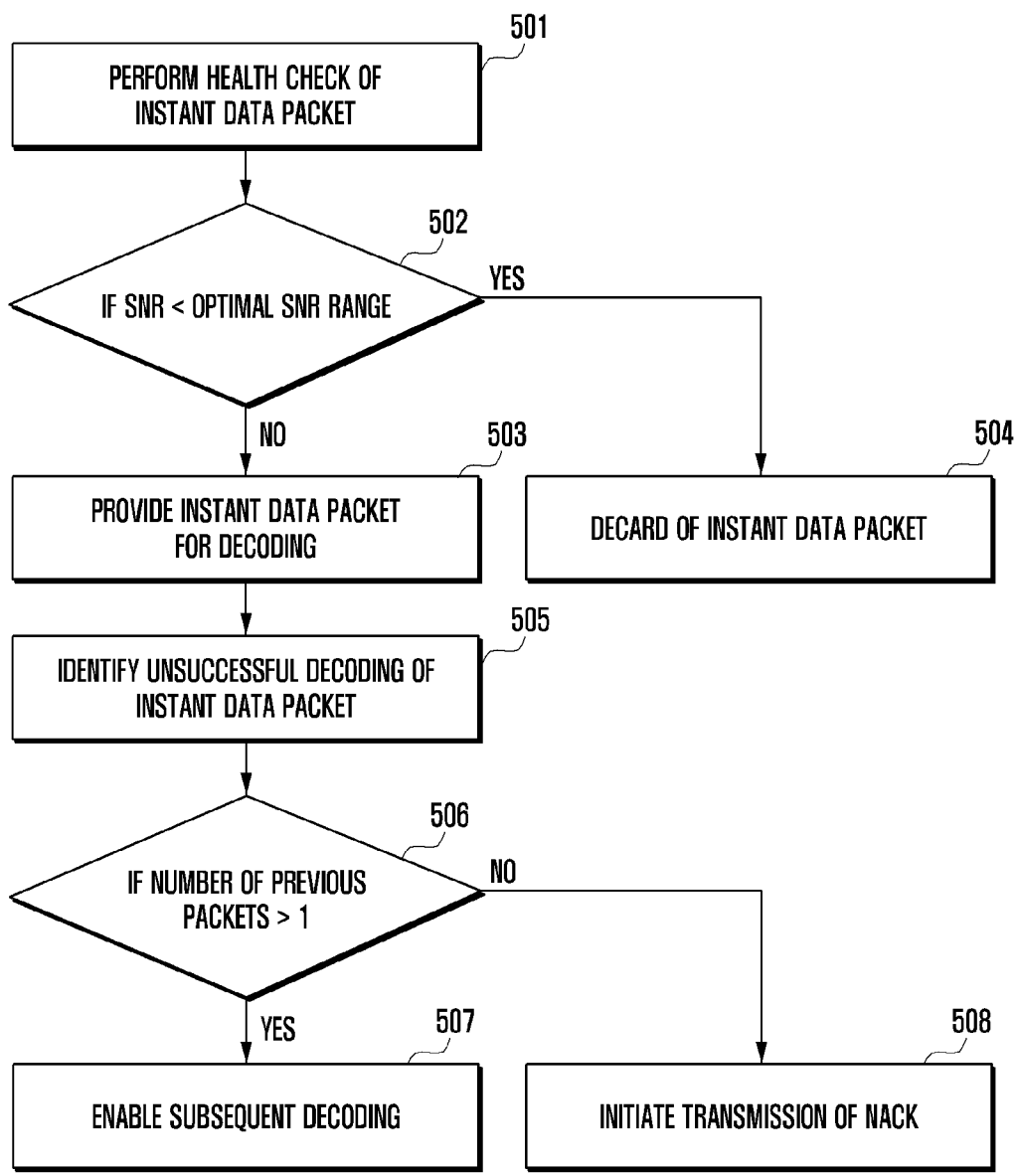
FIG. 5 shows a flow diagram illustrating method of an apparatus for enabling optimized decoding of data packet in HARQ based communication in a wireless communication network, in accordance with some embodiments of present disclosure.

FIG. 5 shows a flow diagram illustrating method of the apparatus 104 for enabling the optimized decoding of the data packet, in accordance with some embodiments of present disclosure.

At block 501, the apparatus 104 may be configured to perform health check of the instant data packet. For performing the health check, the apparatus may be configured to identify SINR associated with the instant data packet. In an embodiment, the optimal SINR range may be determined using the trained neural network model based on the one or more factors related to the wireless communication network.

At block 502, the apparatus 104 may be configured to compare the SINR with the optimal SINR range associated with at least one of the receiver unit and the transmitting unit.

When the SINR is within or greater than the optimal SINR range, step in block 503 may be performed. When the SINR is lesser than the optimal SINR range, step in block 504 may be performed.

At block 503, the SINR is within or greater than the optimal SINR range, the instant data packet may be provided for the decoding by the apparatus 104. The instant data packet may be provided to the decoder 105 of the receiving unit 101 for the decoding.

At block 504, when the SINR is lesser than the optimal SINR range, the apparatus may be configured to discard the instant data packet and initiate transmission of the NACK message to the transmitting unit 102 from the receiving unit 101.

At block 505, the apparatus 104 may be configured to identify unsuccessful decoding of instant data packet. In an embodiment, the unsuccessful decoding may be identified when the decoder 105 is unable to decode the data packet received from the transmitting unit. One or more techniques, known to a person skilled in the art, may be implemented in the apparatus 104 to identify the unsuccessful decoding.

At block 506, upon identifying the unsuccessful decoding, the apparatus 104 may be configured to check if the number of previous data packets received preceding the instant data packet, is greater than one. By this, the apparatus 104 may be able to infer if there are preceding data packets to generate the one or more modified data packets. In case there are no preceding data packets, i.e., the number of previous data packets is not greater than one, then the apparatus 104 may be configured to perform step in block 504. If the number of previous data packets is greater than one, then the apparatus 104 may be configured to perform step in block 503.

At block 507, in case the number of previous data packets is greater than one, the processor is configured to enable subsequent decoding in the receiving unit 101 for the instant data packet. The subsequent decoding includes generating sequentially, the one or more modified versions of data packets, for decoding. The one or more modified versions comprises all possible weighted combinations of the data packets with at least one of the instant data packet and one or more of the previous data packets. One or more techniques, known to a person skilled in the art may be implemented to generate the one or more modified versions. In an embodiment, weights associated with the weighted combination of the data packets is determined using the learning model. In an embodiment, the learning model may be a machine learning model or artificial Intelligence. In an embodiment, the weights may be selected based on one or more parameters affecting the wireless communication network. In an embodiment, the one or more modified versions of the data packets are generated in a predetermined order. In an embodiment, the predetermined order may be based on number of data packets considered for generating the one or more modified versions. For example, the number of data packets considered for generating the one or more modified versions may increase for subsequent modified versions. For four data packets, initial modified versions may be generated for any two data packets. Subsequent modified versions may used three data packets and final modified version may use all four data packets.

The apparatus 104 may be configured to generate a subsequent modified version from the one or more modified versions, when unsuccessful decoding is identified for previously generated modified version from the one or more modified versions. In an embodiment, the apparatus 104 may be configured to store each of the one or more modified versions of the data packets. In an embodiment, the stored modified version may be used for generating the subsequent modified version. Storing of the one or more modified versions may include to store all individual data packets and combined packets separately in the memory 108 of the apparatus 104. and check whether the CRC is pass or not (check) for all the individual packets and combined packets (i.e., combined packets, we mean, all the packets combinations) in every iteration.

In an embodiment, the apparatus 104 may be configured to initiate transmission of the NACK message to the transmitting unit 102 from the receiving unit, when no possible combinations of the data packets is available for generating the one or more modified versions. In an embodiment, the apparatus 104 may be configured to abort the subsequent decoding when the number of previous data packets is one of greater than and equal to a predefined retransmission threshold. In an embodiment, the predefined re-transmission threshold may vary based on capacity of the wireless communication network. In an embodiment, the predefined re-transmission threshold may also be termed as maximum number of re-transmissions. In an embodiment, the apparatus 104 may be configured to initiate transmission of an Acknowledgement (ACK) message to the transmitting unit 102 from the receiving unit 101 when one of the instant data packet and the one or more modified versions of the data packet is decoded successfully.

At block 508, when the number of previous data packets is not greater than one, the apparatus 104 may be configured to initiate transmission of the NACK message to the transmitting unit. Thus, retransmission of redundant versions may be initiated at the transmitting unit.

As illustrated in FIG. 5, the method 500 may include one or more blocks for executing processes in the apparatus 104. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

An embodiment of the present disclosure proposes to enhance existing scheme of HARQ, by proposing an ordered and weighted chase combining. The proposed scheme combines all possible weighted combinations of received data packets in the predetermined order. This provisions significant improvement in packet decoding probability, leading to higher throughput and also aids in reduction in latency.

An embodiment of the present disclosure reduces processing latency by generating the modified versions at the receiver end to decode the packet. Such reduction may be quite essential for VRAN systems. Also, since the modified version are generated at the receiver, HARQ retransmissions may be saved and thus, transmit power may be saved and spectral efficiency may be improved.

An embodiment of the present disclosure discloses to decode packets successfully with lesser number of redundancy versions. Hence, overall throughput as well as spectral efficiency may be improved. This results in better utilization of the spectrum. As required number of UE transmission will come down, UE power efficiency may also be improved.

An embodiment of the present disclosure provisions to discard data packets which is associated with undesirable SINR even before decoding such data packets. Thus, couple of combinations may be avoided for decoding and computational complexity may be reduced. In turn memory requirement is lessened.

Computing System

Figure 6:
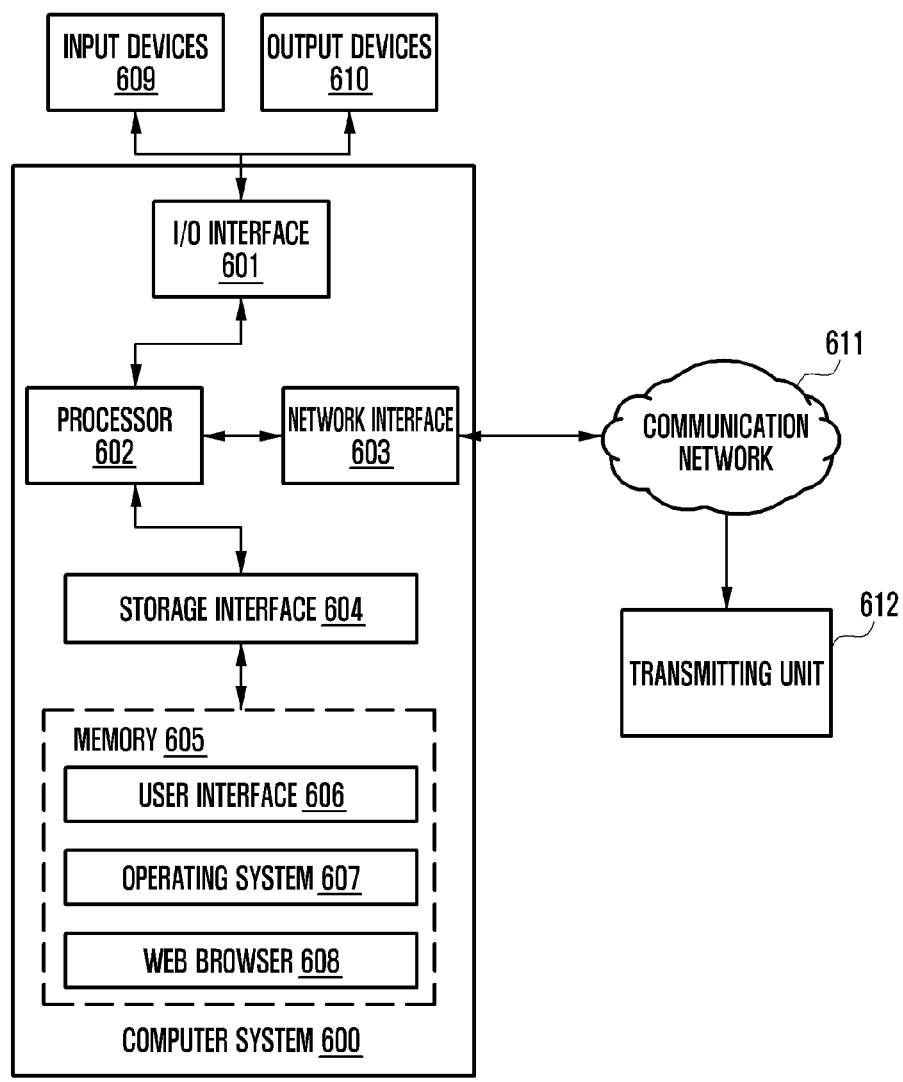
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the apparatus 104 for enabling optimized decoding in a wireless communication network. The computer system 600 may include a central processing unit ("CPU" or "processor") 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices 609 and 610 via I/O interface 601. The I/O interface 601 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light emitting diode (LED), plasma, Plasma Display Panel (PDP), Organic light-emitting diode display (OLED) or the like), audio speaker, etc.

In some embodiments, the computer system 600 may consist of the apparatus 104. The processor 602 may be disposed in communication with a communication network (not shown in figure) via a network interface 603. The network interface 603 may communicate with the communication network. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface 603 and the communication network, the computer system 600 may communicate with a transmitting unit 612, for enabling the optimized decoding. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 608 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C #, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

SEQUENCE LIST TEXT

100 Exemplary environment
101 Receiving unit
102 Transmitting unit
103 Communication network
104 Apparatus
105 Decoder
106 Processor
107 I/O interface
108 Memory
109 Modules
110 Data
201 Decoding identification module
203 Transmission initiation module
204 Health check module
205 Other modules
206 Decoding data
207 Data packets data
208 SINR data
209 Optimal SINR range data
208 Other data
600 Computer System
601 I/O Interface
602 Processor
603 Network Interface
604 Storage Interface
605 Memory
606 User Interface
607 Operating System
608 Web Server
609 Input Devices
610 Output Devices
611 Communication Network
612 Transmitting unit

The invention claimed is:

1. A method performed by an apparatus for enabling optimized decoding of data packet in a wireless communication network, the method comprising:
identifying unsuccessful decoding of an instant data packet received from a transmitting device;
identifying whether a number of previous data packet that is received preceding the instant data packet is greater than one; and
in case that the number of the previous data packet that is received preceding the instant data packet is greater than one, enabling subsequent decoding for the instant data packet,
wherein the subsequent decoding comprises:
sequentially generating one or more modified versions of data packets for decoding, the one or more modified versions comprising possible weighted combinations of the data packets with at least one of the instant data packet and one or more of the previous data packets, and each of the one or more modified versions being decoded individually and a subsequent modified version from the one or more modified versions being generated in case that unsuccessful decoding is detected for previously generated modified version from the one or more modified versions,
identifying whether the number of the previous data packet is equal to predetermined threshold; and determining to abort the subsequent decoding in case that the number of the previous data packet is equal to the predetermined threshold.

2. The method of claim 1, further comprising performing a health check of the instant data packet prior to decoding of the instant data packet by:
identifying a signal to interference plus noise ratio (SINR) associated with the instant data packet;
comparing the SINR with an optimal SINR range; and
discarding the instant data packet when the SINR is lesser than the optimal SINR range to abort decoding of the instant data packet.

3. The method of claim 2, wherein the optimal SINR range is determined based on a trained neural network model.

4. The method of claim 1, further comprising:
identifying the unsuccessful decoding in case that the number of the previous data packets is lesser than one; and
initiating a transmission of a negative-acknowledgement (NACK) message to the transmitting device.

5. The method of claim 1, further comprising initiating a transmission of a negative-acknowledgement (NACK) message to the transmitting device in case that no possible combinations of the data packets is available for generating the one or more modified versions.

6. The method of claim 1, further comprising storing each of the one or more modified versions of the data packets, wherein each of the stored one or more modified versions of the data packets is used for generating the subsequent modified version.

7. The method of claim 1, wherein the one or more modified versions of the data packets are generated in a predetermined order.

8. The method of claim 1, further comprising, initiating a transmission of an acknowledgement (ACK) message to the transmitting device in case that one of the instant data packet and the one or more modified versions of the data packet are decoded successfully.

9. An apparatus for enabling optimized decoding of data packet in a wireless communication network, the apparatus comprises:
memory; and
a processor communicatively coupled to the memory, the processor configured to:
identify unsuccessful decoding of instant data packet received from a transmitting device,
identify whether a number of previous data packet that is received preceding the instant data packet is greater than one, and
in case that the number of the previous data packet that is received preceding the instant data packet is greater than one, enable subsequent decoding for the instant data packet,
wherein the processor is further configured to perform subsequent decoding by:
sequentially generating one or more modified versions of data packets for decoding, the one or more modified versions comprising possible weighted combinations of the data packets with at least one of the instant data packet and one or more of the previous data packets, and each of the one or more modified versions being decoded individually and a subsequent modified version from the one or more modified versions being generated when unsuccessful decoding is detected for previously generated modified version from the one or more modified versions,
identify whether the number of the previous data packet is equal to predetermined threshold, and
determine to abort the subsequent decoding in case that the number of the previous data packet is equal to the predetermined threshold.

10. The apparatus of claim 9, wherein the processor is further configured to perform a health check of the instant data packet prior to decoding of the instant data packet by:
identifying a signal to interference plus noise ratio (SINR) associated with the instant data packet;
comparing the SINR with an optimal SINR range; and
discarding the instant data packet when the SINR is lesser than the optimal SINR range to abort decoding of the instant data packet.

11. The apparatus of claim 10, wherein the optimal SINR range is determined based on a trained neural network model.

12. The apparatus of claim 9, wherein the processor is further configured to:
identify the unsuccessful decoding in case that the number of the previous data packets is lesser than one; and
initiate a transmission of a non-acknowledgement (NACK) message to the transmitting device.

13. The apparatus of claim 9, wherein the processor is further configured to initiate transmission of a negative-acknowledgement (NACK) message to the transmitting device in case that no possible combinations of the data packets is available for generating the one or more modified versions.

14. The apparatus of claim 9, wherein the processor is further configured to store each of the one or more modified versions of the data packets, each of the stored one or more modified versions of the data packet being used for generating the subsequent modified version.

15. The apparatus of claim 9, wherein the one or more modified versions of the data packets are generated in a predetermined order.

* * * * *